(12) United States Patent
Ismailov

(10) Patent No.: US 6,874,480 B1
(45) Date of Patent: *Apr. 5, 2005

(54) FLOW METER

(75) Inventor: Murad M. Ismailov, Lansing, MI (US)

(73) Assignee: Combustion Dynamics Corp., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/779,123

(22) Filed: Feb. 13, 2004

Related U.S. Application Data

(63) Continuation-in-part of application No. 10/351,757, filed on Jan. 27, 2003, which is a division of application No. 09/854,561, filed on May 15, 2001, now Pat. No. 6,510,842, which is a continuation-in-part of application No. 09/614,381, filed on Jul. 3, 2000, now abandoned.

(51) Int. Cl.[7] .............................. G01F 1/00; G01D 3/36; F02D 41/14
(52) U.S. Cl. ...................... 123/494; 73/119 A; 356/28.5
(58) Field of Search ................................ 123/478, 480, 123/494; 73/119 A, 861; 250/574; 356/28, 28.5

(56) References Cited

U.S. PATENT DOCUMENTS

| | | | | | |
|---|---|---|---|---|---|
| 4,428,228 A | * | 1/1984 | Banzhaf et al. | ........... | 73/119 A |
| 4,818,101 A | * | 4/1989 | Soreide et al. | ............. | 356/28.5 |
| 5,686,989 A | * | 11/1997 | Hoffman et al. | ............ | 356/336 |
| 6,508,112 B1 | * | 1/2003 | Verhoeven | ................ | 73/119 A |
| 6,510,836 B2 | * | 1/2003 | Ismailov | ...................... | 123/494 |
| 6,510,842 B2 | * | 1/2003 | Ismailov | ...................... | 123/494 |

* cited by examiner

*Primary Examiner*—Tony M. Argenbright
(74) *Attorney, Agent, or Firm*—Greenberg Traurig LLP

(57) ABSTRACT

Various embodiments of the present invention provide a flow meter device having a laser Doppler anemometer (LDA) which measures the instantaneous center line velocity of fluid flow in a pipe. The flow meter may process the instantaneous velocity so obtained to compute the volumetric flow rate, mass rate, and/or other flow characteristics (e.g., as instantaneous quantities and/or integrated over a time interval) The flow meter may use an electronic processing method. The electronic processing method may provide essentially an exact solution to the Navier-Stokes equations for any periodically oscillating flow.

38 Claims, 22 Drawing Sheets

FLOW METER

CROSS-REFERENCE TO RELATED APPLICATIONS

This application is a continuation-in-part of U.S. Ser. No. 10/351,757, filed Jan. 27, 2003, which is a divisional application of U.S. Ser. No. 09/854,561, filed May 15, 2001, now U.S. Pat. No. 6,510,842, which is a continuation-in-part of U.S. Ser. No. 09/614,381, filed Jul. 3, 2000, now abandoned.

FIELD OF THE INVENTION

Various embodiments of the present invention relate to flow meters (e.g., for measuring the flow of fluid through a conduit). In one example (which example is intended to be illustrative and not restrictive) the flow meters described may be adapted for measuring the volumetric flow rate for a high pressure direct injection automotive fuel injection system. Also described are software methods of determining the volumetric flow rate for a periodic oscillating flow in a pipe from measurement of the instantaneous center line velocity.

BACKGROUND OF THE INVENTION

In automotive fuel injection systems, the power delivered by the engine is related to the shape of the spray, as well as the quantity and timing of fuel delivered to the combustion chamber.

Various devices for measuring fluid flow characteristics, at various points in the flow, have been described previously. For example:

U.S. Pat. No. 3,338,093, issued Aug. 29, 1967 to J. D. Usry et al. relates to an injectant stream analyzer for measuring the momentum and solidity of fluid free streams from injection valves or the like by causing a wire to transect the stream.

U.S. Pat. No. 3,548,655, issued Dec. 22, 1970 to M. J. Rudd, describes a laser Doppler velocimeter for measuring the velocity of fluid flow which measures the sinusoidal variation in light intensity as a particle in the fluid passes through interference fringes produced by laser beam which passes through a two slit mask. No means for measuring instantaneous velocity is described, nor is velocity necessarily measured on a center line. Further, no processing means for computing volumetric flow rate is described, and no means for indicating the direction of the velocity is described.

U.S. Pat. No. 3,825,346, issued Jul. 23, 1974 to J. Rizzo, reaches an interferometer for measuring fluid flow which uses two earns, a reference beam and a test beam, which travel equal path lengths and recombine to form an interference pattern.

U.S. Pat. No. 3,937,087, issued Feb. 10, 1976 to W. S. Heggie, teaches a transducer for measuring pressure changes during fuel injection. The transducer is a resistive element in the form of a coil wrapped around the fuel line which varies in resistance as the fuel line expands and contracts, the difference in current through the coil being measured through a bridge.

U.S. Pat. No. 4,073,186, issued Feb. 14, 1978 to C. L. Erwin, Jr., describes a flow meter having a magnet mechanically attached to a valve, the magnet generating current in a magnetic pickup as the valve opens and closes for counting the flow pulses, the device releasing metered amounts of fuel with each pulse. The device appears to be for measuring fuel consumption, and not for regulating fuel flow into an injector.

U.S. Pat. No. 4,165,635, issued Aug. 28, 1979 to Komaroff et al. relates to a method of testing fuel-injector spray nozzles in which a laser beam is directed onto a light detector along a path passing close to the spray orifice(s) of a fuel injector spray nozzle.

U.S. Pat. No. 4,192,179, issued Mar. 11, 1980 to E. Yelke, discloses a collar which fits around a fuel line to a fuel injector and has piezoelectric material affixed to the inside surface of the collar to develop an electrical signal as the fuel line expands and contracts.

U.S. Pat. No. 4,541,272, issued Sep. 17, 1985 to Bause relates to an electronically controlled fuel injector system including an electrically controllable injection valve disposed at a suction pipe to supply fuel and an electro-optical spectrometer which analyses the air-fuel mixture sucked in by the engine.

U.S. Pat. No. 5,031,460, issued Jul. 16, 1991 to Kanenobu et al., teaches a device for detecting pressure changes in pipes. The device is a transducer with a bimorph piezoelectric transducer; trapped around the pipe to sense expansion of the pipe as fluid is pulsed through the pipe.

U.S. Pat. No. 6,049,382, issued April 11, 2000 to Lazaro Gomez relates to an apparatus and procedure for characterization of sprays composed by spherical particles, by means of a laser source generating a collimated laser beam that is passed through the spray to be characterized.

German Patent No. DE3817096, published Dec. 8, 1988, relates to a method for testing injection valves and an apparatus for carrying out the method. More particularly, a laser beam penetrating the exit stream of an injection valve underneath its exit opening is captured by a receiver to make a statement about the production quality of the injection valve.

European Patent No. 489,474, published Jun. 10, 1992, describes a laser apparatus for measuring the velocity of a fluid which uses an interferometer type device with a laser beam split into a reference beam and a measurement beam which is reflected back through the fluid so that the back scatter is compared to the reference beam to measure velocity. No method for processing the velocity to compute volumetric flow rate is described.

French Patent No. FR2719871, published Nov. 17, 1995, relates to test equipment for fuel injectors of internal combustion engines. More particularly, the characteristics of a jet of fuel are detected by e.g., a CCD video camera with image processor, a laser granulometer and a display.

Japanese Patent No. 8-121,288, published May 14, 1996, shows a device for measuring injection rate with a pressure sensor for measuring the force of injection and a laser Doppler anemometer for measuring velocity, and which uses a mathematical formula which relates force and velocity to flow rate.

Japanese Patent No. 8-121,289, published May 14, 1996, describes a device which uses two laser Doppler anemometers, one in the main supply line, the other in a bias flow generating unit fed by a divider pipe, to measure the flow rate by a differential flow rate method.

Applicant has co-authored several publications which disclose flow measuring devices. An article titled "Measurement of instantaneous flow rates in periodically operating injection systems" by F. Durst, M. Ismailov, and D. Trimis, published in *Experiments in Fluids*, Vol. 20, pp. 178–188 in 1996, describes a technique for measuring instantaneous flow rates using laser Doppler anemometry to measure center line velocity in a capillary pipe and an improved solution of the Navier-Stokes equations for any periodically oscillating flow to calculate instantaneous violumetric flow rate. The device measured the flow of water released by a magnetically operated valve through a 2 mm diameter tube.

A paper presented at the Flomeko '98 9th International Conference on Flow Measurement in June, 1998, titled "Accurate LDA Measurements of Instantaneous and Integrated Flow Rates in High pressure Gasoline Injection System" by Ismailov et al., describes device for measuring flow rate in a gasoline injection system at 7 MPa with a Unisia Jecs swirl injector. The device uses a 16 mW He—Ne laser directed through a beam splitter and frequency shifted) Bragg cells, focused by a lens to form a measurement control volume 485 $\mu$m in length and 46 $\mu$m in diameter on the center line of quartz pipe 300 mm long having an inner diameter of 3.5 mm. The light is scattered by heptane and detected through a pinhole by a photomultiplier tube elevated at a 30°, the output being processed by a DOSTEK interface board. The center line velocities are processed according to the method set forth in Durst, supra.

A paper presented at the 3rd ASME/JSME Joint Fluids Engineering Conference July 18–23, 1999 titled "Instantaneous Flow Rates in Gasoline Direct Injection System By Means of LDA and Bosch Meters" by Ismailov et al., and an article titled "LDA/PDA measurements of instantaneous characteristics in high pressure fuel injection and swirl spray" by Ismailov et al. in *Experiments in Fluids*, Vol. 27, pp. 1–11 (1999) present similar studies and describe similar measuring devices to those presented in the Flomeko article, supra.

Figure 1:
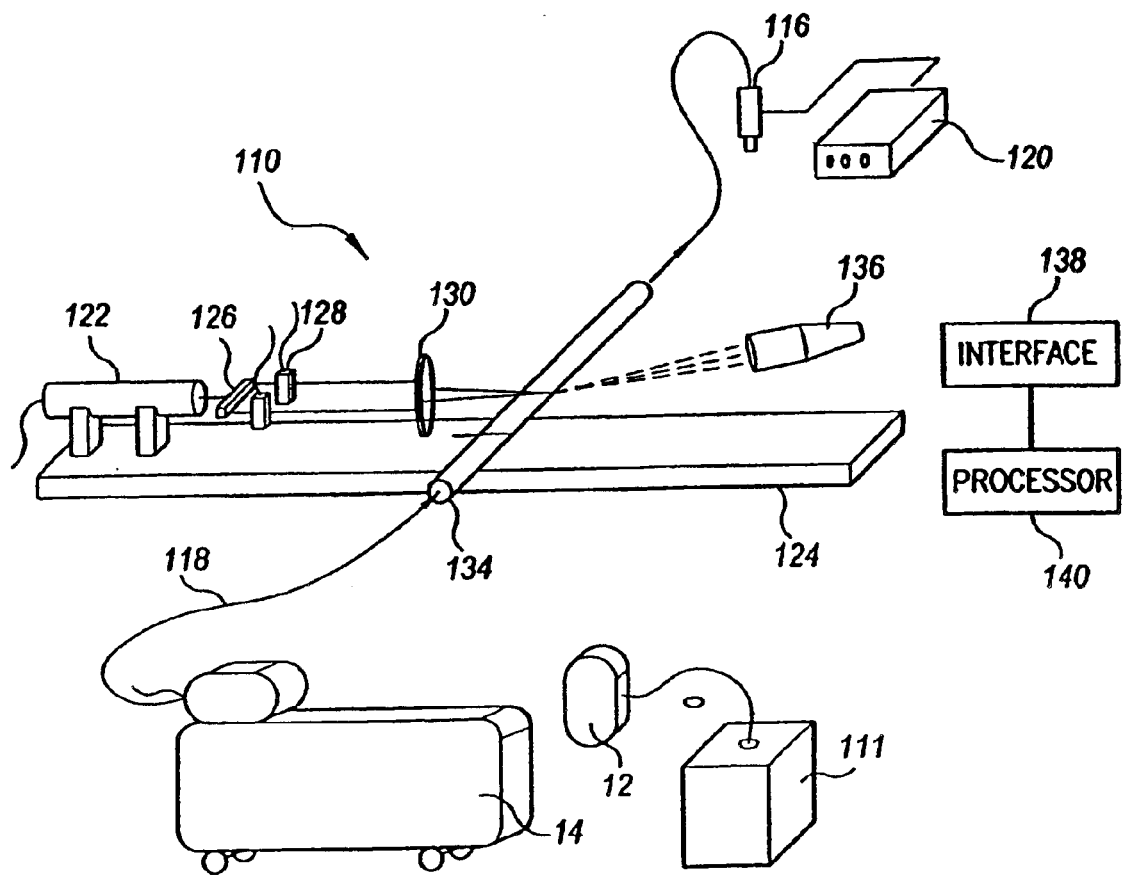
FIGS. 1A and 1B are diagrammatic views of a stationary stand flow meter according to two embodiments of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof (of note, similar reference characters denote corresponding features consistently throughout the attached drawings).

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment an on-board flow meter for installation in a fuel pipeline of a fuel injection engine is provided, comprising: (a) a measurement tube adapted for installation in a fuel pipeline of a fuel injection engine; (b) a laser-Doppler anemometer generating a pair of laser beams intersecting in a control measurement volume in a center line of fuel flow through said measurement tube; (c) an interface card connected to said laser-Doppler anemometer for calculating a series of instantaneous center line velocities of fuel flow through said measurement tube; and (d) a processor connected to said interface card, the processor having means for computing instantaneous and integral volumetric and mass flow rates in said measurement tube, the processor being connected to an engine electronic control unit; whereby the electronic control unit uses the volumetric and mass low rates to adjust fuel injection parameters in order to optimize fuel flow in the engine.

In one example, said measurement tube may comprise: (a) an elongated, transparent, quartz glass tube; and (b) a steel jacket, said quartz tube being sheathed within said steel jacket.

In another example, said laser-Doppler anemometer may comprise: (a) a laser diode attached to said measurement tube and disposed to emit a laser beam normal to a longitudinal axis of said measurement tube; (b) beam splitting means for splitting the laser beam emitted by said laser diode into two laser beams focused to intersect in the control measurement volume in the center line of said measurement tube; (c) a PIN diode for receiving light scattered by fuel flowing in the control measurement zone of said measurement tube, the PIN diode being disposed on a side of the measurement tube opposite said laser diode to receive forward scatter; and (d) focusing means for focusing scattered light from the control measurement zone on said PIN diode.

In another example, said beam splitting means may comprise: (a) an X-Y traverse frame disposed between said laser diode and said measurement tube; (b) an optic fiber disposed on said traverse frame parallel to a crystal emitting stripe of said laser diode; and (c) a three-wire guitar having a highly reflecting back surface disposed on said traverse frame, the three wires being disposed to block zero order and second order harmonics of the split laser beam, first order harmonics of the laser beam being focused to intersect in the control measurement volume on the center line of said measurement tube.

In another example, said focusing means may comprise: (a) an X-Y traverse frame disposed between said PIN diode and said measurement tube; (b) an optic fiber mounted on said traverse frame; and (c) a plate having a pinhole defined therein mounted between said optic fiber and said PIN diode.

In another example, said means for computing instantaneous and integral volumetric and mass flow rates may comprise:

(a) a first set of instructions which cause said processor to read basic parameters, including fuel viscosity, fluid density, injection duration, injection period, and radius of the measurement tube;

(b) a second set of instructions which cause said processor to compute constant parameters, including frequency and angular frequency;

(c) a third set of instructions which cause said processor to input the series of instantaneous center line velocities from said interface card;

(d) a fourth set of instructions which cause said processor to perform an inverse Fourier transform to calculate a first series of harmonic coefficients $c_0, \ldots c_n$, from the series of center line velocities; (e) a fifth set of instructions which cause said processor to compute a series of pressure coefficients $p_o, \ldots, p_n$ from the harmonic coefficients $p_o, \ldots, p_n$ by solving the equations $$p_o = \frac{2c_o v}{R^2} \text{ and } p_n = \frac{c_n i n\omega}{1 - \frac{1}{J_o(i^{3/2}Ta_n)}}$$

(f) a sixth set of instructions which cause said processor to compute a series of instantaneous volumetric flow rates from the pressure coefficients $p_o, \ldots, p_n$, by solving the equation $$v(\tau) = \frac{\pi R^2}{2}\left(\frac{R^2 p_o}{4v} + \sum_{n=i}^{\infty}\left\{\frac{p_n}{n\omega}ie^{in\omega t}\left[\frac{4i^{1/2}J_1(i^{3/2}Ta_n)}{Ta_n J_o(i^{3/2}Ta_n)} - 2\right] + C.C.\right\}\right); \text{ and}$$

(g) a seventh set of instructions which cause said processor to compute a mass flow rate by integrating the volumetric flow rates using the fluid density and cross sectional area of the measurement tube.

In another example, said means for computing instantaneous and integral volumetric and mass flow rates may comprise:

(a) a first set of instructions which cause said processor to read basic parameters, including fuel viscosity, fluid density, injection duration, injection period, and radius of the measurement tube;

(b) a second set of instructions which cause said processor to compute constant parameters, including frequency and angular frequency;

(c) a third set of instructions which cause said processor to input the series of instantaneous center line velocities from said interface card;

(d) a fourth set of instructions which cause said processor to perform an inverse Fourier transform to calculate a first series of harmonic coefficients $c_0, \ldots, c_n$ and a second series of harmonic coefficients $c_0', \ldots, c_n'$ from the series of center line velocities, where the summation in the first series is incremented when the Stokes layer thickness is greater than ten times the optic interference fringe from the intersection of the two laser beams and the summation in the second series is incremented when the Stokes layer thickness is not greater than ten times the optic interference fringe from the intersection of the two laser beams;

(e) a fifth set of instructions which cause said processor to compute a series of pressure coefficients $p_o, \ldots, p_n$ and $p_o', \ldots, p_n'$ from the harmonic coefficients $c_o, \ldots, c_n$ and $c_o', \ldots, c_n'$ by solving the equations $$p_{oz} = 2\frac{c_o v}{R^2}$$

$$p_{nz} = \frac{c_n n\omega i}{\left[1 - \frac{1}{J_0(i^{3/2}Ta_n)}\right]}, n \in [1, N_\delta]$$

$$p'_{nz} + \sqrt{p'_{nz}p'_{nr}} = \frac{2c'_n n\omega i}{\left[1 - \frac{1}{J_0(i^{3/2}Ta_n)}\right]}, n \in [N_\delta + 1, N_{Roso}];$$

(f) a sixth set of instructions which cause said processor to compute a series of instantaneous volumetric flow rates from the pressure coefficients $p_o, \ldots, p_n$ and $p_o', \ldots, p_n'$, by solving the equation $$\dot{v}(\tau) = 2\pi \int_o^R (\bar{u} + \sqrt{\overline{u'v'}})r dr = \frac{\pi R^2}{2}\left[\frac{p_o R^2}{4v} + \sum_{n=1}^{\infty}\left(\frac{p_{nz} + \left(\frac{p'_{nz}}{2} + \frac{\sqrt{p'_{nz}p'_{nz}}}{2}\right)}{n\omega}ie^{in\omega t}\left\{\frac{4i^{1/2}J_1(i^{3/2}Ta_n)}{Ta_n J_0(i^{3/2}Ta_n)} - 2\right\}\right) + \right.$$

$$\left. C.C. \right]; \text{ and}$$

(g) a seventh set of instructions which cause said processor to compute a mass flow rate by integrating the volumetric flow rates using the fluid density and cross sectional area of the measurement tube.

In another embodiment a flow meter for measuring fuel flow characteristics in a fuel injection system is provided, comprising: (a) a measurement tube adapted for installation in a fuel pipeline of a fuel injection system; (b) a laser-Doppler anemometer generating a pair of laser beams intersecting in a control measurement volume in a center line of fuel flow through said measurement tube; (c) an interface card connected to said laser-Doppler anemometer for calculating a series of instantaneous center line velocities of fuel flow through said measurement tube; and (d) a processor connected to said interface card, the processor having means for computing instantaneous and integral volumetric and mass flow rates in said measurement tube.

In one example, the flow meter may further comprise: (a) a fuel tank; (b) a fuel injection pump; (c) a fuel injector; (d) a fuel pipeline connecting said fuel tank, said fuel pump, and said fuel injector, said measurement tube being disposed in said fuel pipeline between said fuel pump and said fuel injector; and (e) wherein said laser-Doppler anemometer may comprise: (i) an optical bench, said measurement tube being disposed on the optical bench; (ii) a laser light source attached to the optical bench disposed to emit a laser beam normal to said measurement tube; (iii) a prism disposed between said laser light source and said measurement tube for splitting the laser beam into two collimated beams; (iv) a pair of Braggs cells mounted on the optical bench, the Braggs cells modulating the two laser beams with a fixed frequency difference; (v) a focusing lens mounted on the optical bench to focus the two laser beams on a control measurement volume on the centerline of said measurement tube; and (vi) a photodetector mounted opposite said measurement tube for detecting forward scatter of the two laser beams.

In another example: said laser light source may comprise a helium-neon laser and said photodetector may comprise a photomultiplier tube.

In another example: said laser light source may comprise a laser diode; and said photodetector may comprise a PIN diode.

In another example, the flow meter may further comprise an external controller connected to said fuel pump for controlling the duration and frequency of fuel injection pulses.

In another example, the flow meter may further comprise an electronic control unit connected to said fuel pump for controlling the duration and frequency of fuel injection pulses, the electronic control unit having a time base capable of nanosecond pulse duration.

In another example, said measurement tube may comprise: (a) a cylindrical quartz glass tube having an inlet end and an outlet end; (b) a rectangular glass tube having an inlet end and an outlet end, the rectangular glass tube being disposed about said quartz glass tube; (c) an inlet plug and an outlet plug, each plug having a rectangular plate sealing the inlet and outlet ends of the rectangular glass tube, respectively, and having a nipple extending from the rectangular plate; (d) a cylindrical fitting disposed in each said nipple, the inlet end of said quartz glass tube extending into the nipple of the inlet plug and abutting the cylindrical fitting, and the outlet end of the quartz glass tube extending into the nipple of the outlet plug and abutting the cylindrical fitting; (e) a cylindrical inlet unit attached to the inlet plug, the cylindrical inlet unit being adapted for attachment to the fuel pipeline; and (f) a cylindrical outlet unit attached to the outlet plug, the outlet unit being adapted for attachment to a fuel injector.

In another example, said laser Doppler anemometer may comprise: (a) a laser diode emitting a laser beam; (b) a prism redirecting the laser beam normal to said measurement tube; (c) a first lens disposed between said laser diode and said prism for collimating the laser beam; (d) a holographic splitter disposed between said prism and said measurement tube for splitting the laser beam into two beams and for focusing the two beams to intersect in a control measurement volume in the center line of said measurement tube; (e) a PIN diode disposed on a side of said measurement tube opposite said laser diode to detect forward scatter from the intersecting laser beams; (f) a pinhole mask disposed between said PIN diode and said measurement tube; and (g) a second lens disposed between said measurement tube and said pinhole mask for focusing the forward scatter on said PIN diode.

In another example, the flow meter may further comprise a box, said measurement tube and said laser-Doppler anemometer being disposed in said box, said measurement tube being adapted for insertion in a fuel pipeline of a fuel injection engine.

In another example: (a) said measurement tube may comprise: (i) an elongated, transparent, quartz glass tube adapted for insertion in a fuel pipeline of a fuel injection engine; (ii) a steel jacket, said quartz tube being sheathed within said steel jacket; and (b) said laser-Doppler anemometer may comprise: (i) a laser diode attached to said measurement tube and disposed to emit a laser beam normal to a longitudinal axis of said measurement tube; (ii) beam splitting means for splitting the laser beam emitted by said laser diode into two laser beams focused to intersect in the control measurement volume in the center line of said measurement tube; (iii) a PIN diode for receiving light scattered by fuel flowing in the control measurement zone of said measurement tube, the PIN diode being disposed on a side of the measurement tube opposite said laser diode to receive forward scatter; and (iv) focusing means for focusing scattered light from the control measurement zone on said PIN diode.

In another example, said means for computing instantaneous and integral volumetric and mass flow rates may comprise:

(a) a first set of instructions which cause said processor to read basic parameters, including fuel viscosity, fluid density, injection duration, injection period, and radius of the measurement tube;

(b) a second set of instructions which cause said processor to compute constant parameters, including frequency and angular frequency;

(c) a third set of instructions which cause said processor to input the series of instantaneous center line velocities from said interface card;

(d) a fourth set of instructions which cause said processor to perform an inverse Fourier transform to calculate a first series of harmonic coefficients $c_0, \ldots, c_n$, and a second series of harmonic coefficients $c_0', \ldots, c_n'$, from the series of center line velocities; where the summation in the first series is incremented when the Stokes layer thickness is greater than ten times the optic interference fringe from the intersection of the two laser beams and the summation in the second series is incremented when the Stokes layer thickness is not greater than ten times the optic interference fringe from the intersection of the two laser beams;

(e) a fifth set of instructions which cause said processor to compute a series of pressure coefficients $p_0, \ldots, p_n$, and $c_0', \ldots, c_n'$ from the harmonic coefficients $c_0, \ldots, c_n$ and $c_o', \ldots, c_n'$ by solving the equations $$p_{oz} = 2\frac{c_o v}{R^2}$$

$$p_{nz} = \frac{c_n n\omega i}{\left[1 - \frac{1}{J_0(i^{3/2}Ta_n)}\right]}, n \in [1, N_\delta]$$

$$p'_{nz} + \sqrt{p'_{nz}p'_{nr}} = \frac{2c'_n n\omega i}{\left[1 - \frac{1}{J_0(i^{3/2}Ta_n)}\right]}, n \in [N_\delta + 1, N_{meas}];$$

(f) a sixth set of instructions which cause said processor to compute a series of instantaneous volumetric flow rates from the pressure coefficients $p_0, \ldots, p_n$, and $p_0', \ldots p_n'$ by solving the equation $$\dot{v}(\tau) = 2\pi \int_o^R (\bar{u} + \sqrt{\overline{u'v'}})rdr = \frac{\pi R^2}{2}\left[\frac{p_o R^2}{4v} + \sum_{n=1}^{\infty}\left(\frac{p_{nz} + \left(\frac{p'_{nz}}{2} + \frac{\sqrt{p'_{nz}p'_{nz}}}{2}\right)}{n\omega} ie^{in\omega t}\left\{\frac{4i^{1/2}J_1(i^{3/2}Ta_n)}{Ta_n J_0(i^{3/2}Ta_n)} - 2\right\}\right) + C.C.\right];$$ and (g) a seventh set of instructions which cause said processor to compute a mass flow rate by integrating the volumetric flow rates using the fluid density and cross sectional area of the measurement tube.

In another example, said means for computing instantaneous and integral volumetric and mass flow rates may comprise:

(a) a first set, of instructions which cause said processor to read basic parameters, including fuel viscosity, fluid density, injection duration, injection period, and radius of the measurement tube;

(b) a second set of instructions which cause said processor to compute constant parameters, including frequency and angular frequency;

(c) a third set of instructions which cause said processor to input the series of instantaneous center line velocities from said interface card;

(d) a fourth set of instructions which cause said processor to perform an inverse Fourier transform to calculate a series of harmonic coefficients $c_0, \ldots, c_n$, from the series of center line velocities;

(a) a fifth set of instructions which cause said processor to compute a series of pressure coefficients $p_0, \ldots p_n$, from the harmonic coefficients $c_0, \ldots, c_n$ by solving the equations $$p_o = \frac{2c_o v}{R^2} \text{ and } p_n = \frac{c_n in\omega}{1 - \frac{1}{J_0(i^{3/2}Ta_n)}}$$

(f) a sixth set of instructions which cause said processor to compute a series of instantaneous volumetric flow rates from the pressure coefficients $p_0, \ldots, p_n$, by solving the equation $$v(\tau) = \frac{\pi R^2}{2}\left(\frac{R^2 p_o}{4v} + \sum_{n=i}^{\infty}\left\{\frac{p_n}{n\omega}ie^{in\omega t}\left[\frac{4i^{1/2}J_1(i^{3/2}Ta_n)}{Ta_n J_0(i^{3/2}Ta_n)} - 2\right] + C.C.\right\}\right);$$ and (g) a seventh set of instructions which cause said processor to compute a mass flow rate by integrating the volumetric flow rates using the fluid density and cross' sectional area of the measurement tube.

In another embodiment an electronic data processing method for measuring volumetric flow rates and mass flow rates of a periodically oscillating fluid flow in a pipeline is provided, comprising the steps of:

(a) inserting a measurement tube in a pipeline;

(b) measuring a series of instantaneous velocities, u(t), on a center line of the pipeline by laser-Doppler anemometer;

(c) performing an inverse Fourier transform on the measured series of instantaneous velocities to obtain a first series of harmonic coefficients $c_0, \ldots, c_n$, and a second series of harmonic coefficients $c_0', \ldots, c_n'$ where the summation in the first series is incremented when the Reynolds number is $\leq 3000$ and the summation in the second series is incremented when the Reynolds number is $>3000$; (d) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2\frac{c_o v}{R^2}$$

$$\dot{p}_{nz} = \frac{c_n n\omega i}{\left[1 - \frac{1}{J_0(i^{3/2}Ta_n)}\right]}, n \in [1, N_\delta]$$

$$p'_{nz} + \sqrt{p'_{nz}p'_{nr}} = \frac{2c'_n n\omega i}{\left[1 - \frac{1}{J_0(i^{3/2}Ta_n)}\right]}, n \in [N_\delta + 1, N_{meas}];$$ and (e) computing a series of instantaneous volumetric flow rates from the pressure coefficients $p_0, \ldots, p_n$, and $p_0', \ldots, p_n'$ by solving the equation $$\dot{v}(\tau) = 2\pi \int_o^R (\bar{u} + \sqrt{\overline{u'v'}})rdr = \frac{\pi R^2}{2}\left[\frac{p_o R^2}{4v} + \sum_{n=1}^{\infty}\left(\frac{\dot{p}_{nz} + \left(\frac{p'_{nz}}{2} + \frac{\sqrt{p'_{nz}p'_{nz}}}{2}\right)}{n\omega} ie^{in\omega t}\left\{\frac{4i^{1/2}J_1(i^{3/2}Ta_n)}{Ta_n J_0(i^{3/2}Ta_n)} - 2\right\}\right) +$$

-continued $$\left. C.C. \right].$$

In another embodiment a flow meter for bench testing fuel flow characteristics in a fuel injection system, which fuel injection system includes at least one fuel injector is provided, comprising: a measurement tube via which fuel flowing through the fuel injector passes; a laser-Doppler anemometer generating a pair of laser beams intersecting in a control measurement volume in a center line of fuel flow through the measurement tube; a velocity calculating mechanism connected to the laser-Doppler anemometer for calculating a series of instantaneous center line velocities of fuel flow through the measurement tube; and a flow rate calculating mechanism connected to the velocity calculating mechanism for calculating a series of instantaneous volumetric flow rates in the measurement tube and for calculating a mass flow rate by integrating the series of instantaneous volumetric flow rates.

In one example, the measurement tube may be constructed at least in part from quartz glass.

In another example, the quartz glass may be substantially transparent.

In another example, the flow meter may further comprise an optical bench, wherein at least one of the measurement tube and the laser-Doppler anemometer is mounted to the optical bench.

In another example, the laser-Doppler anemometer may comprise a laser light source and a photodetector.

In another example, the laser light source may comprise a helium-neon laser and the photodetector may comprise a photomultiplier tube.

In another example the laser light source may comprise a laser diode and the photodetector may comprise a PIN diode.

In another example, the flow rate calculating mechanism may include means for:

(a) performing an inverse Fourier transform to calculate a series of harmonic coefficients $c_0, \ldots, c_n$ from the series of instantaneous center line velocities;

(b) computing a series of pressure coefficients $p_o, \ldots, p_n$ from the harmonic coefficients $c_0, \ldots, c_n$ by solving the equations $$p_o = \frac{2c_o \nu}{R^2} \text{ and } p_n = \frac{c_n in\omega}{1 - \frac{1}{J_0(i^{3/2} Ta_n)}}$$

(c) computing a series of instantaneous volumetric flow rates from the pressure coefficients $p_0, \ldots, p_n$, by solving the equation $$v(\tau) = \frac{\pi R^2}{2} \left( \frac{R^2 p_o}{4\nu} + \sum_{n=1}^{\infty} \left\{ \frac{p_n}{n\omega} i e^{in\omega t} \left[ \frac{4i^{1/2} J_1(i^{3/2} Ta_n)}{Ta_n J_0(i^{3/2} Ta_n)} - 2 \right] + C.C. \right\} \right); \text{ and}$$

(d) computing a mass flow rate by integrating the volumetric flow rates using the fluid density and cross sectional area of the measurement tube.

In another example, the flow rate calculating mechanism may include means for:

(a) performing an inverse Fourier transform to calculate a first series of harmonic coefficients $c_0, \ldots, c_n$ and a second series of harmonic coefficients $c_0', \ldots, c_n'$ from the series of instantaneous center line velocities, where the summation in the first series is incremented when the Stokes layer thickness is greater than ten times the optic interference fringe from the intersection of the two laser beams and the summation in the second series is incremented when the Stokes layer thickness is not greater than ten times the optic interference fringe from the intersection of the two laser beams;

(b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2 \frac{c_o \nu}{R^2}$$

$$p_{nz} = \frac{c_n n\omega i}{\left[1 - \frac{1}{J_0(i^{3/2} Ta_n)}\right]}, n \in [1, N_\delta]$$

$$p_{nz}' + \sqrt{p_{nz}' p_{nr}'} = \frac{2c_n' n\omega i}{\left[1 - \frac{1}{J_0(i^{3/2} Ta_n)}\right]}, n \in [N_\delta + 1, N_{meas}];$$

(c) computing a series of instantaneous volumetric flow rates from the pressure coefficients $p_0, \ldots, p_n$ and $p_0', \ldots, p_n'$ by solving the equation $$\dot{v}(\tau) = 2\pi \int_o^R \left( \tilde{u} + \sqrt{u'v'} \right) r \, dr = \frac{\pi R^2}{2} \left[ \frac{p_o R^2}{4\nu} + \sum_{n=1}^{\infty} \left( \frac{p_{nz} - \left\{ \frac{p_{nz}'}{2} + \frac{\sqrt{p_{nz}' p_{nz}'}}{2} \right\}}{n\omega} i e^{in\omega t} \left\{ \frac{4i^{1/2} J_1(i^{3/2} Ta_n)}{Ta_n J_0(i^{3/2} Ta_n)} - 2 \right\} \right) + \left. C.C. \right]; \text{ and}$$

(d) computing a mass flow rate by integrating the volumetric flow rates using the fluid density and cross sectional area of the measurement tube.

In another example, the flow rate calculating mechanism may include means for:

(a) performing an inverse Fourier transform on the series of instantaneous center line velocities to obtain a first series of harmonic coefficients $c_0, \ldots, c_n$, and a second series of harmonic coefficients $c_0', \ldots, c_n'$, where the summation in the first series is incremented when the Reynolds number is $\leq 3000$ and the summation in the second series is incremented when the Reynolds number is $> 3000$;

(b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2 \frac{c_o \nu}{R^2}$$

$$p_{nz} = \frac{c_n n\omega i}{\left[1 - \frac{1}{J_o(i^{3/2} Ta_n)}\right]}, n \in [1, N_\delta]$$

-continued $$p'_{nz} + \sqrt{p'_{nz}p'_{nr}} = \frac{2c'_n n\omega i}{\left[1 - \frac{1}{J_0(i^{3/2}Ta_n)}\right]}, n \in [N_\delta + 1, N_{meas}]; \text{ and}$$

(c) computing a series of instantaneous volumetric flow rates from the pressure coefficients $p_0, \ldots, p_n$, and $p_0', \ldots, p_n'$ by solving the equation $$\dot{v}(t) = 2\pi \int_o^R \left(\bar{u} + \sqrt{u'v'}\right) r dr = \frac{\pi R^2}{2} \left[ \frac{p_o R^2}{4v} + \sum_{n=1}^{\infty} \left( \frac{\dot{p}_{nz} - \left\{\frac{p'_{nz}}{2} + \frac{\sqrt{p'_{nz}p'_{nz}}}{2}\right\}}{n\omega} i e^{in\omega t} \left\{\frac{4i^{1/2}J_1(i^{3/2}Ta_n)}{Ta_n J_0(i^{3/2}Ta_n)} - 2\right\} \right) + C.C. \right].$$

In another example, the flow meter may further comprise a fuel tank and a fuel injection pump.

In another example, the flow meter may further comprise a controller connected to the fuel pump for controlling the duration and frequency of a plurality of fuel injection pulses.

In another example, the controller may be capable of nanosecond pulse duration.

In another example, at least one of the velocity calculating mechanism and the flow rate calculating mechanism may include software.

In another embodiment a flow meter for bench testing fuel flow characteristics in a fuel injection system, which fuel injection system includes at least one fuel injector is provided, comprising: at least one of an input pipe for supplying fuel to the fuel injector and an output pipe for receiving fuel from the fuel injector; a measurement tube installed in one of the input pipe and the output pipe; a laser-Doppler anemometer generating a pair of laser beams intersecting in a control measurement volume in a center line of fuel flow through the measurement tube; a velocity calculating mechanism connected to the laser-Doppler anemometer for calculating a series of instantaneous center line velocities of fuel flow through the measurement tube; and a flow rate calculating mechanism connected to the velocity calculating mechanism for calculating a series of instantaneous volumetric flow rates in the measurement tube and for calculating a mass flow rate by integrating the series of instantaneous volumetric flow rates.

In one example, the measurement tube may be constructed at least in part from quartz glass.

In another example, the quartz glass may be substantially transparent.

In another example the flow meter may further comprise an optical bench, wherein at least one of the measurement tube, the input pipe, the output pipe and the laser-Doppler anemometer is mounted to the optical bench.

In another example, the laser-Doppler anemometer may comprise a laser light source and a photodetector.

In another example, the laser light source may comprise a helium-neon laser and the photodetector may comprise a photomultiplier tube.

In another example, the laser light source may comprise a laser diode and the photodetector may comprise a PIN diode.

In another example, the flow rate calculating mechanism may include means for:

(a) performing an inverse Fourier transform to calculate a series of harmonic coefficients $c_0, \ldots, c_n$ from the series of instantaneous center line velocities;

(b) computing a series of pressure coefficients $p_0, \ldots, p_n$ from the harmonic coefficients $c_0, \ldots, c_n$ by solving the equations $$p_o = \frac{2c_o v}{R^2} \text{ and } p_n = \frac{c_n in\omega}{1 - \frac{1}{J_0(i^{3/2}Ta_n)}}$$

(c) computing a series of instantaneous volumetric flow rates from the pressure coefficients $p_0, \ldots, p_n$, by solving the equation $$v(t) = \frac{\pi R^2}{2} \left( \frac{R^2 p_o}{4v} + \sum_{n+1}^{\infty} \left\{ \frac{p_n}{n\omega} i e^{in\omega t} \left[ \frac{4i^{1/2}J_1(i^{3/2}Ta_n)}{Ta_n J_0(i^{3/2}Ta_n)} - 2 \right] + C.C. \right\} \right); \text{ and}$$

(d) computing a mass flow rate by integrating the volumetric flow rates using the fluid density and cross sectional area of the measurement tube.

In another example, the flow rate calculating mechanism may include means for:

(a) performing an inverse Fourier transform to calculate a first series of harmonic coefficients $c_0, \ldots, c_n$, and a second series of harmonic coefficients $c_0', \ldots, c_n'$ from the series of instantaneous center line velocities, where the summation in the first series is incremented when the Stokes layer thickness is greater than ten times the optic interference fringe from the intersection of the two laser beams and the summation in the second series is incremented when the Stokes layer thickness is not greater than ten times the optic interference fringe from the intersection of the two laser beams;

(b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2\frac{c_o v}{R^2}$$

$$p_{nz} = \frac{c_n n\omega i}{\left[1 - \frac{1}{J_0(i^{3/2}Ta_n)}\right]}, n \in [1, N_\delta]$$

$$p'_{nz} + \sqrt{p'_{nz}p'_{nr}} = \frac{2c'_n n\omega i}{\left[1 - \frac{1}{J_0(i^{3/2}Ta_n)}\right]}, n \in [N_\delta + 1, N_{meas}];$$

(c) computing a series of instantaneous volumetric flow rates from the pressure coefficients $p_0, \ldots, p_n$ and $p_0', \ldots, p_n'$ by solving the equation $$\dot{v}(t) = 2\pi \int_o^R \left(\bar{u} + \sqrt{u'v'}\right) r dr = \frac{\pi R^2}{2} \left[ \frac{p_o R^2}{4v} + \right.$$

$$\sum_{n=1}^{\infty}\left\{\frac{p_{nz}+\left(\frac{p'_{nz}}{2}+\frac{\sqrt{p'_{nz}p'_{nz}}}{2}\right)}{n\omega}ie^{in\omega t}\left\{\frac{4i^{1/2}J_1(i^{3/2}Ta_n)}{Ta_nJ_0(i^{3/2}Ta_n)}-2\right\}\right\}+$$

$$C.C.\Bigg]; \text{ and}$$

(d) computing a mass flow rate by integrating the volumetric flow rates using the fluid density and cross sectional area of the measurement tube.

In another example, the flow rate calculating mechanism may include means for:

(a) performing an inverse Fourier transform on the series of instantaneous center line velocities to obtain a first series of harmonic coefficients $c_0, \ldots, c_n$, and a second series of harmonic coefficients $c_0', \ldots, c_n'$, where the summation in the first series is incremented when the Reynolds number is $\leq 3000$ and the summation in the second series is incremented when the Reynolds number is $>3000$;

(b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2\frac{c_o V}{R^2}$$

$$\dot{p}_{nz} = \frac{c_n n\omega i}{\left[1-\frac{1}{J_0(i^{3/2}Ta_n)}\right]}, n \in [1, N_\delta]$$

$$p'_{nz}+\sqrt{p'_{nz}p'_{nr}} = \frac{2c'_n n\omega i}{\left[1-\frac{1}{J_0(i^{3/2}Ta_n)}\right]}, n \in [N_\delta+1, N_{meas}]; \text{ and}$$

(c) computing a series of instantaneous volumetric flow rates from the pressure coefficients $p_0, \ldots, p_n$, and $p_0', \ldots, p_n'$ by solving the equation $$\dot{V}(t)=2\pi\int_o^R\left(\bar{u}+\sqrt{\overline{u'v'}}\right)rdr = \frac{\pi R^2}{2}\left[\frac{p_o R^2}{4v}+\right.$$

$$\sum_{n=1}^{\infty}\left\{\frac{p_{nz}-\left(\frac{p'_{nz}}{2}+\frac{\sqrt{p'_{nz}p'_{nz}}}{2}\right)}{n\omega}ie^{in\omega t}\left\{\frac{4i^{1/2}J_1(i^{3/2}Ta_n)}{Ta_nJ_0(i^{3/2}Ta_n)}-2\right\}\right\}+$$

$$\left.C.C.\Bigg].$$

In another example, the flow meter may further comprise a fuel tank and a fuel injection pump.

In another example, the flow meter may further comprise a controller connected to the fuel pump for controlling the duration and frequency of a plurality of fuel injection pulses.

In another example, the controller may be capable of nanosecond pulse duration.

In another example: (a) a cross-section of the input pipe may be selected from the group of circular, oval, square and rectangular; (b) a cross-section of the output pipe may be selected from the group of circular, oval, square and rectangular; and (c) a cross-section of the measurement tube may be selected from the group of circular, oval, square and rectangular.

In another example: (a) the input pipe may be included; and (b) the measurement tube may be installed in the input pipe.

In another example, the output pipe may be not included.

In another example: (a) the output pipe may be included; and (b) the measurement tube may be installed in the output pipe.

In another example, the input pipe may be not included.

In another example, the flow meter may comprise a check valve installed in the output pipe to control backpressure in the output pipe.

In another example, the flow meter may comprise an orifice plate installed in the output pipe to control pressure in the output pipe.

In another example, the flow meter may further comprise: (a) a check valve installed in the output pipe to control backpressure in the output pipe; and (b) an orifice plate installed in the output pipe to control pressure in the output pipe; wherein: (i) the output pipe has a first end and a second end, which first end is connected to the fuel injector; (ii) the check valve is installed at the second end of the output pipe; and (iii) the orifice plate is installed at a position in the output pipe between the check valve and the measurement tube.

In another example, the flow meter may further comprise a fuel injector tip holder for connecting an output tip of the fuel injector to the output pipe.

In another example, the flow meter may further comprise a pressure transducer disposed within the fuel injector tip holder.

In another example, at least one of the velocity calculating mechanism and the flow rate calculating mechanism may include software.

In summary, under one embodiment of the present invention a flow meter having a laser Doppler anemometer (LDA) is provided. Such a flow meter may be used to measure the instantaneous center line velocity of fluid flow in a pipe and processes the instantaneous velocity so obtained to compute the volumetric flow rate, mass rate, and/or other flow characteristics as instantaneous quantities and/or integrated over a time interval using an processing method (e.g., electronic) which provides an exact solution to the Navier-Stokes equations for any periodically oscillating flow. The flow meter may be adapted, for example, for measuring the flow characteristics of high pressure automotive fuel injection systems. A number of embodiments of the flow meter are described, including a stationary stand for off-line bench testing flow rate in a fuel injection system, a portable flow meter for inline testing in a vehicle's fuel line, and an on-board flow meter sensor connected to an engine control module.

The flow meter may include an LDA, which itself may include: (a) a laser light source which is split into two beams which are focused to intersect in a control measurement zone on the center line of a capillary pipe through which the fluid flows; and (b) a photodetector to detect forward scatter. An interface board may convert the Doppler frequency shift to instantaneous velocity measurements at a programmable sampling rate (e.g., with nanosecond resolution). The velocity measurements may provide data for a processor programmed to perform a discrete Fourier transform, to determine the coefficients of a Fourier expansion of the time resolved LDA measurements, and to use those coefficients to compute instantaneous pressure gradients (which are then used to compute instantaneous volumetric flow rates, mass flow rates, and/or other transient injection characteristics).

FIG. 1 shows one embodiment of a stationary stand flow meter. More particularly, stationary stand flow meter 10 may be used for bench testing, calibration, and/or setup of the optimal characteristics of a diesel or gasoline electronic fuel injection system. For testing purposes, the fuel injection system includes a water-cooled fuel tank 111 (e.g., with a capacity of ten to twenty liters), a low-pressure pump 112 (e.g., with fuel filters), and a high pressure pump 114 (e.g., for delivering the fuel at a maximum pressure of about 7 MPa for testing gasoline direct injection systems, or at a maximum of about 80.0 MPa for testing diesel engines). A fuel injector 116 is installed into the frame of a two-dimensional traversal stand and is directly connected to the high-pressure pump fuel line 118. A rotor-synchronized time controller 120 provides a means for setting an injection frequency (e.g., of 0.5 to 60 Hz) and an injection duration (e.g., of 0.25 to a few milliseconds) with an encoding signal of, for example 360 bin/cycle (which may which may changed (e.g., doubled or tripled) at the user's option to increase the resolution).

Figure 2:
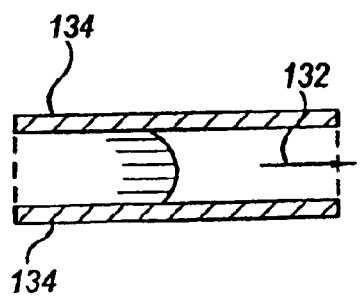
FIG. 2 is a diagram showing a center line velocity to be measured by an LDA component of a flow meter according to an embodiment of the present invention.

The LDA optical units include a laser source 122 mounted on an optical bench 124 which transmits a beam through a beam splitter 126 which divides the beam into two beams. A pair of Bragg cells 128, or acoustical-optical modulators, introduce a fixed frequency difference between the two beams so that the direction of the velocity may be determined. The two beams are focused by lens 130 so that they intersect in the plane of the velocity center line 132 (shown in FIG. 2) of the fluid flow through measurement pipe 134, defining a control measurement volume, or zone (which, for example, typically measures about 485 $\mu$m in length and 46 $\mu$m in diameter with a fringe space of 2.41 $\mu$m). The fuel does not need to be seeded. The high pressure (e.g., greater than 5 MPa for gasoline FIS and greater than 80 MPa for diesel FIS) causes cavitation to occur in the flow so that micrometer and submicrometer gaseous bubbles appear and Mi-scattering of the laser light occurs at the boundaries of the micro-bubbles. The scattered light is collected through a pinhole by an elevated photodetector 136 situated to receive forward scatter. The scattered light contains a Doppler shift, the Doppler frequency of which is proportional to the velocity component of the fluid perpendicular to the bisector of the two beams. The varying intensity of the light causes a varying current which is fed to an interface board 138 which converts the current to the velocity at the sampling rate selected by the user. The velocity data is fed to a processor 140, which computes instantaneous and/or integral volumetric flow rates, mass flow rates, pressure gradients, and/or other data for calibrating the performance of the fuel injector 116.

Figure 3:
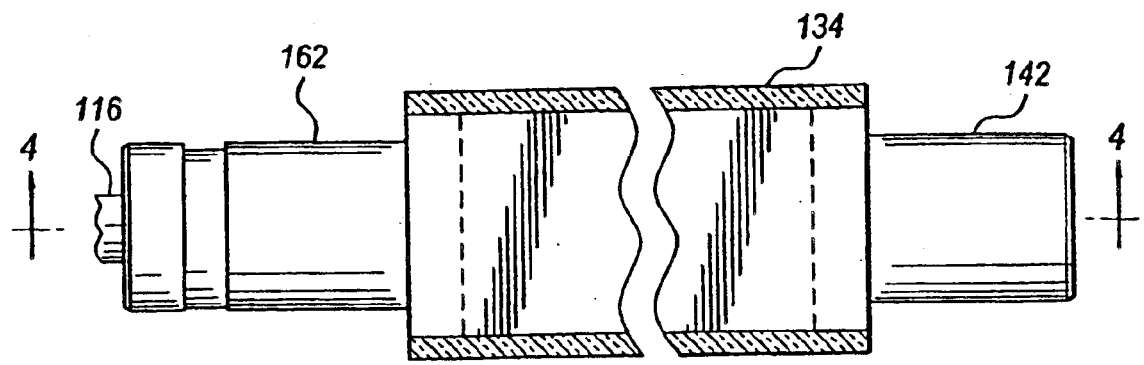
FIG. 3 is a plan view of a capillary measurement pipe for insertion into a pipeline according to an embodiment of the present invention.
Figure 4:
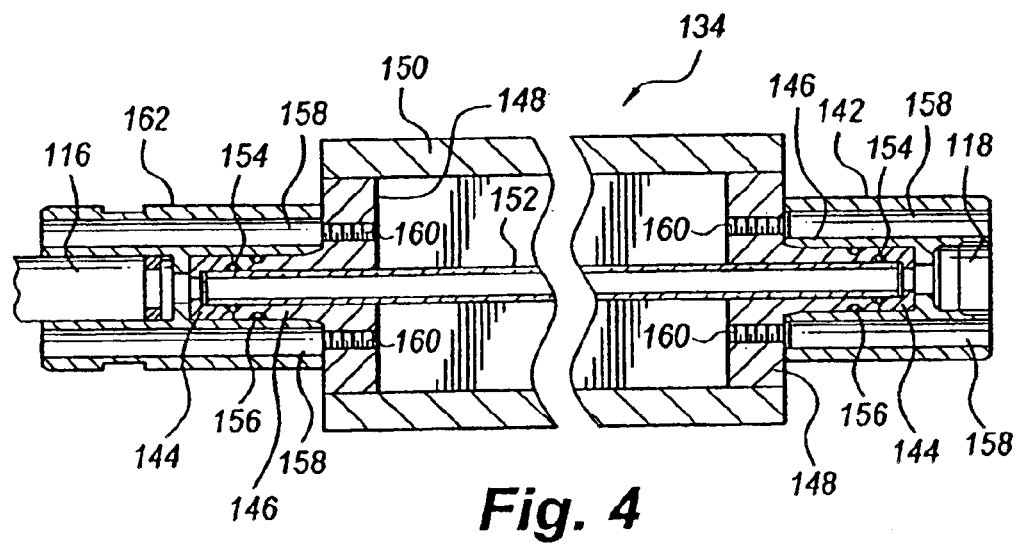
FIG. 4 is a section view along the lines 4—4 of FIG. 3.
Figure 5:
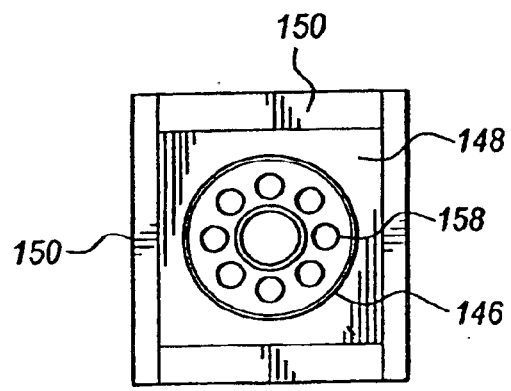
FIG. 5 is an end view of the capillary measurement pipe according to an embodiment of the present invention.

The measurement pipe 134 is described in more detail in connection with FIGS. 3, 4 and 5. In FIGS. 3 and 4, fuel enters the measurement pipe 134 on the right and flows through the pipe 134 to the left. Referring to the right side of FIG. 4, the inlet unit 142 is made from stainless steel and is a cylindrical body which receives a cut end of the high pressure fuel pipeline 118 through which fuel is transported to the injector 116. Disposed within the inlet unit 142 is a stainless steel cylindrical fitting 144 which is axially aligned with a cylindrical nipple 146 integral with and extending from a rectangular, stainless steel plug 148. Plug 148 forms a seal at one end of a rectangular tube housing 150 made of DURON glass. A cylindrical quartz tube 152 is disposed within housing 150 and extends into the nipple 146 of plug 148. O-ring 154 forms a hermetic seal between quartz tube 152 and fitting 144 and nipple 146, while a second O-ring 156 forms a hermetic seal between nipple 146 and inlet unit 142, preventing fuel leakage. A plurality of screws extend through bores 158 in inlet unit 142 and are secured in threaded bores 160 in rectangular plug 148. Referring to the left side of FIG. 4, the outlet side of measurement pipe 134 is symmetrical and identical in construction to the right side, except that outlet unit 162 has a different internal geometry adapted for connection to injector 116.

Fuel flows from the fuel pipeline 118 through inlet fitting 144, quartz tube 152, outlet fitting 144 and into injector 116. Rectangular tube housing 150 is transparent, so that the beams from laser source 122 pass through the wall of housing 150 to intersect in the center line of quartz tube 152, the housing 150 serving to protect the operator in case of sudden breakage of quartz tube 152. Quartz tube 152 is cylindrical and may have a length, for example, of between 200 and 350 mm, depending on injection pressure, and may be between about 3.0 and 3.5 mm in diameter. Scattered light passes out of quartz tube 152 and through the planar opposite wall of housing 150 to photodetector 136.

For a gasoline fuel injection system (e.g., operating at injection pressures between about 5.0 and 7.0 MPa), the laser source 122 may be a 16 mW He-Ne laser and the detector 136 may be a photomultiplier tube. The interface board 138 may be a Dostek model 1400A Laser Velocimeter Interface, made by Dostek, Inc. of Canada, or other conventional LDA interface board. The processor 140 may be a an IBM PC-compatible computer. For a gasoline FIS, the processor 140 may be programmed to resolve instantaneous and/or integral volumetric and mass flow rates for one-dimensional pipe flow, as described below with reference to FIGS. 16A and 16B.

Figure 6A:
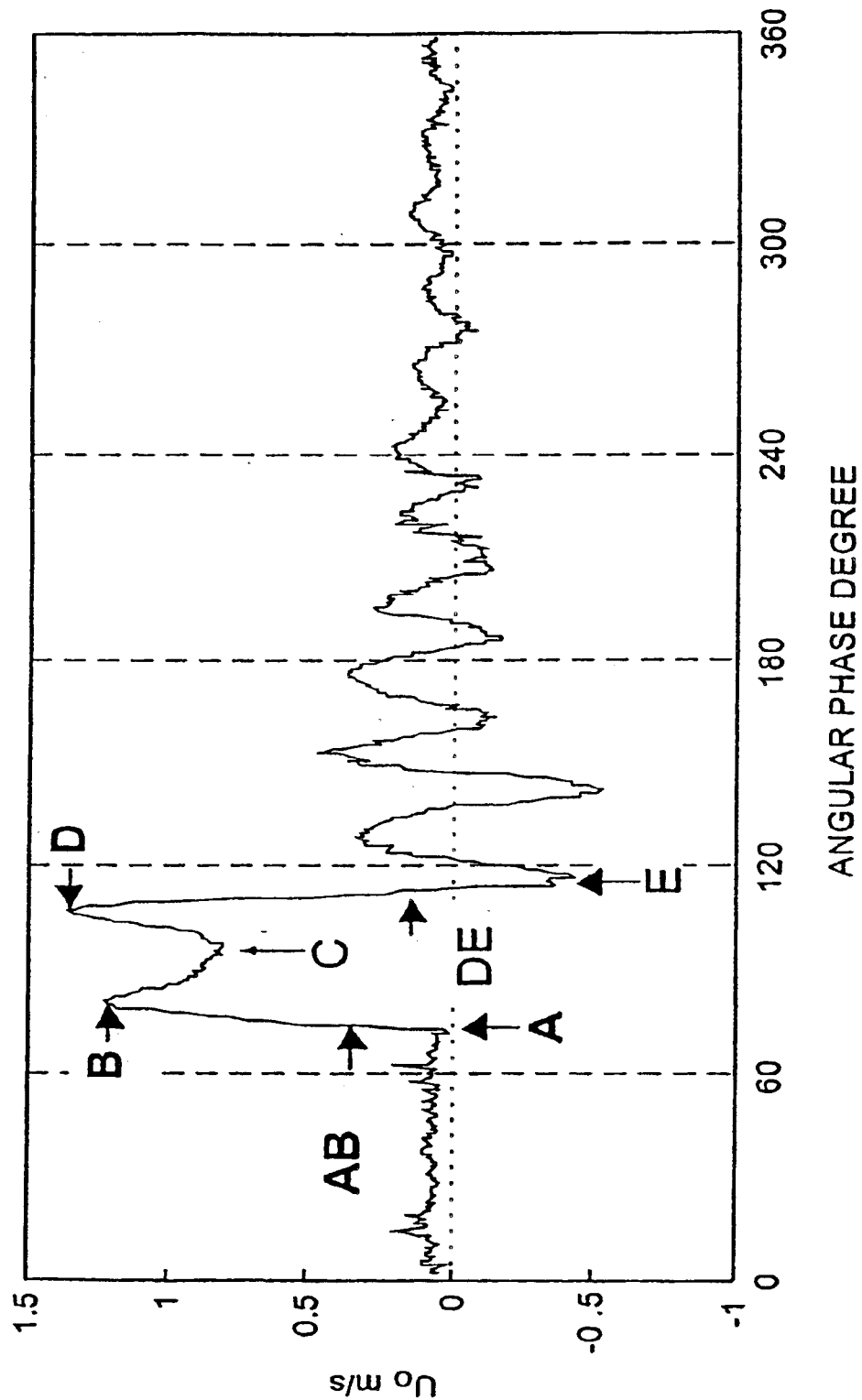
FIGS. 6A, 6B, and 6C are charts showing typical output (in graphic form) from a flow meter according to an embodiment of the present invention.
Figure 6B:
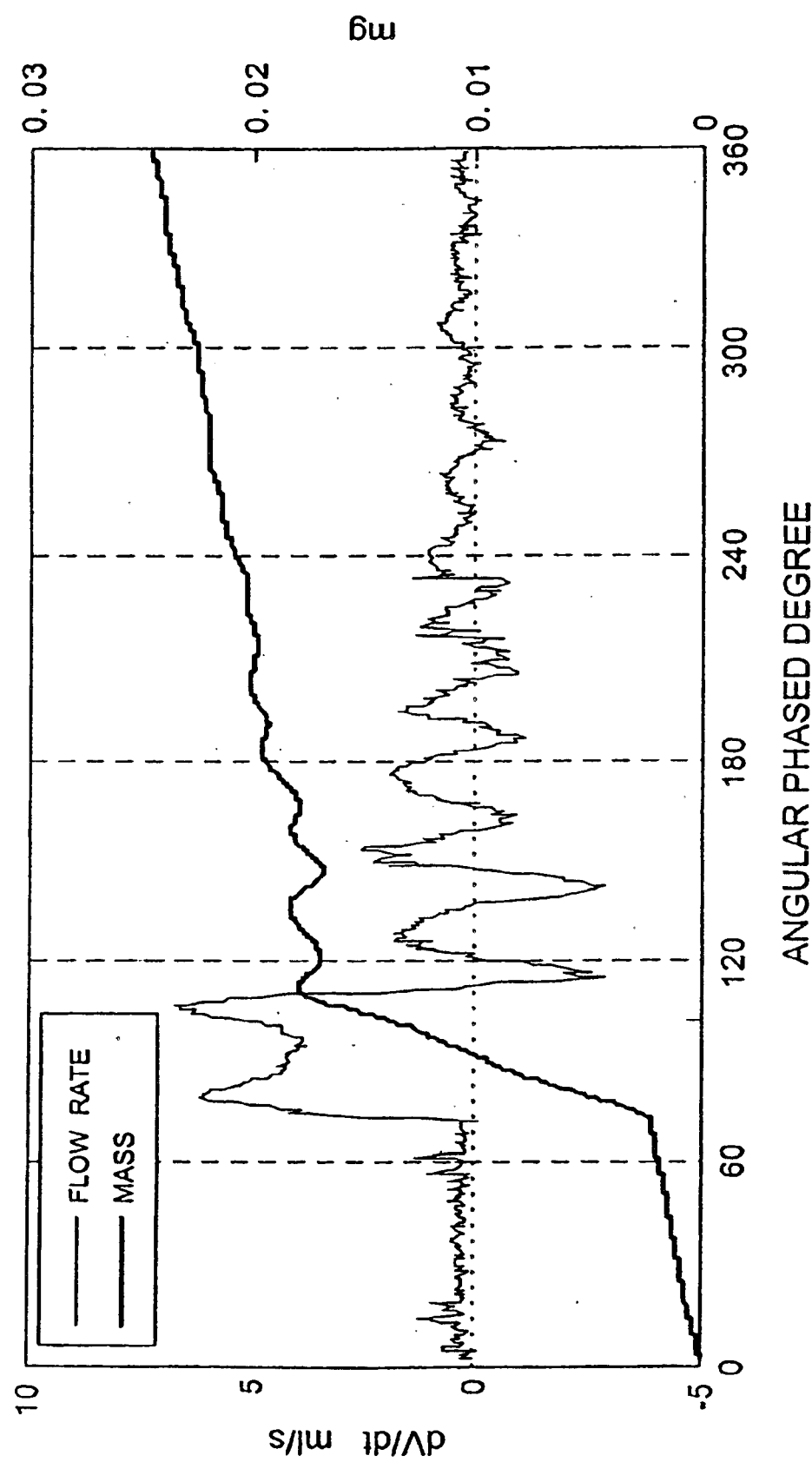
Figure 6C:
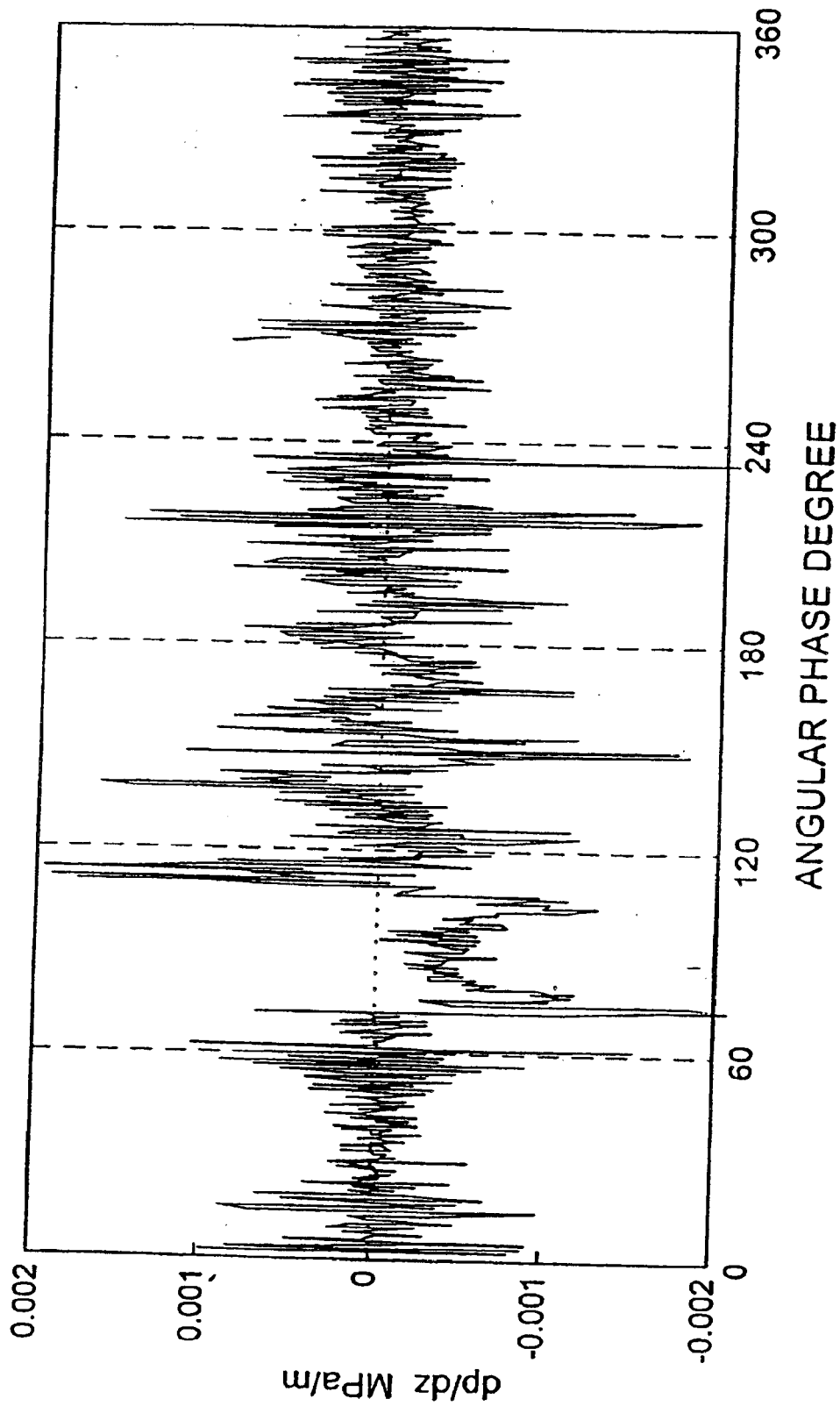

Typical output from the software is shown in graphical form in FIGS. 6A, 6B, and 6C. FIG. 6A shows the instantaneous center line velocity, $U_0$, versus the phase angle. In FIG. 6A, the letter A marks opening of the fuel injector valve and the letter D marks closure of the injector valve, with points B, C, and E marking transitions at various phase angles. FIG. 6B shows the calculated instantaneous volumetric flow rate, dV/dt, and integrated mass, $$m(t) = \int_o^t \frac{dV}{dt} \rho dt,$$

versus the phase angle. FIG. 6C shows the pressure gradient dp/dt versus the phase angle.

For a diesel fuel injection system (e.g., operating at injection pressures between about 80.0 and 100.0 MPa), the components of the stationary stand 110 may need to be modified because of the very high injection pressure and higher fuel now velocity in the fuel transport common rail (e.g., up to 32 m/s, instead of the 6 m/s in gasoline FIS), and the very fast transitions in the flow. First, the laser source 122 may need more power than the He—Ne laser due to the extremely decreased time of the scattering particles passing the LDA control measurement volume at the intersection of the beams. Therefore, for diesel FIS the laser source may be, for example, a diode pumped solid state laser with the emitting second harmonic wavelength of 532 nm, (pumping by 808 run) and power of 50 mW beam pre-collimated optics. Although the detector 136 may be a photomultiplier tube, an avalanche photodiode (at an elevation angle of 28° instead of 30°, for example) may be used as the detector 136 (as it is more sensible in the range of 532 nm laser wave length, and it is more compact and flexible to install).

Furthermore, in a diesel FIS, the temporal resolution is very important for instantaneous flow rate measurements. In order to measure turbulent fluctuations, it may be necessary to have the measurement time span $\Delta t = T/N_{meas}$, where $N_{meas}$=10,000 bins per injection stroke controlled by an electronic time generator or clock pulse. The main criterion to select clock watch resolution is:

$$\delta_n \sqrt{\frac{2v}{n\omega}} = \sqrt{\frac{v \Delta t}{\pi}} \le \Lambda \quad (1)$$

where $\Lambda$, an optic fringe span in the laser beam intersection point, is dependent on laser wavelength $\lambda$ and a half intersection angle $\theta$ determined from $\char`^=\lambda/(2 \sin \theta)$ in order to determine micron and submicron scattering particles, $\char`^$-fringe was fixed to be 1.3 $\mu$m. For diesel injection flow, $\Delta t$ may need to be on the order of 1 $\mu$s, i.e., the time generator must provide a frequency higher than 1 MHz. Stable pulse generation is also required, with frequency fluctuation not lower than 0.1% from the base frequency, for example. Therefore, for diesel FIS, the time controller 120 may not necessarily be an external controller. Rather, the stationary stand 110 may use the quartz clock generator of the 32.768 series with a base frequency of 9.2333 MHz, installed in the Electronic Control Unit of typical existing diesel engines (it is believed that this clock generator is used, for example, in the Detroit Diesel ECU). The second harmonic at 4.617 MHz may be used. The measurement Fast Fourier Transform index may be 10,000 (10,000 spans or output bins per injection stroke) because the typical injection period is varied from a few tens of milliseconds down to a few milliseconds.

Again, in a diesel FIS, the Dostek interface, as well as other conventional LDA interface boards, may provide unacceptable performance as an interface board 138, since the Dostek 1400A uses time/crank angle reference only with a fixed injection period. For diesel systems, it may be necessary to have an interface board which provides flexibility in changing the measurement time span at widely varied injection periods or engine speeds. Therefore, a customized interface card 138 described below with respect to FIG. 15 may be used for diesel FIS. Finally, the software for resolution of instantaneous and/or integral volumetric and mass flow rates for one-dimensional pipe flow, as described below with reference to FIGS. 16A and 16B, may prove to be inadequate in accurately resolving instantaneous rates at the higher pressures and velocities in a diesel system. Therefore, the processor 140 may programmed with the software for resolution of instantaneous and/or integral volumetric and mass flow rates for three-dimensional turbulent pipe flow, as described with reference to FIGS. 17A and 17B.

Figure 7:
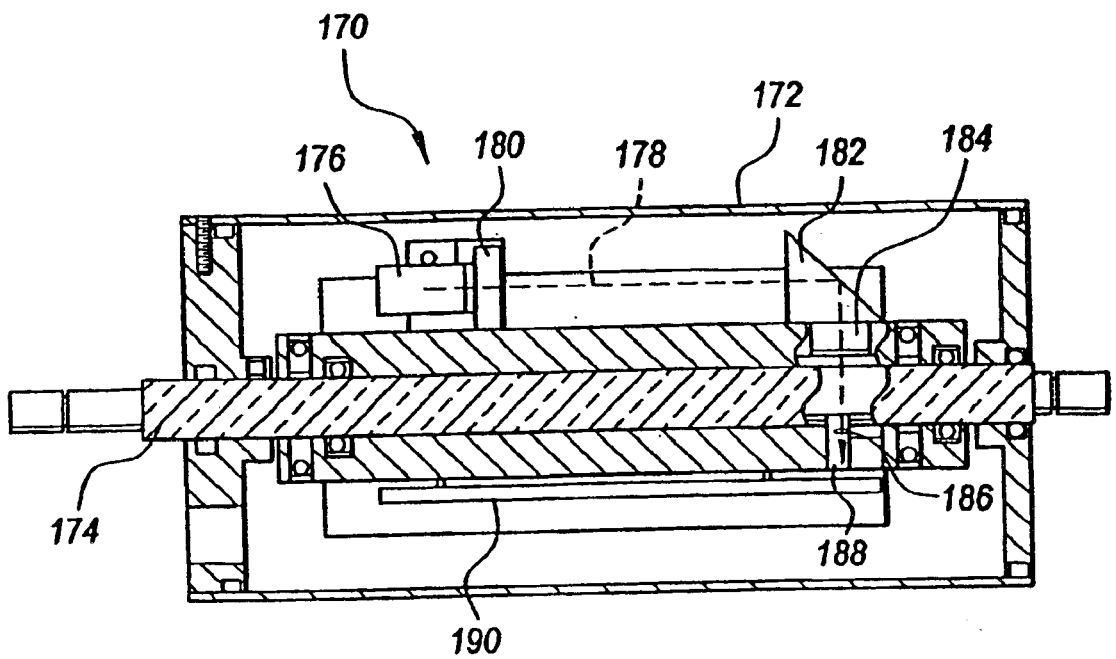
FIG. 7 is a diagrammatic section view of the optical system for a portable flow meter according to an embodiment of the present invention.
Figure 8:
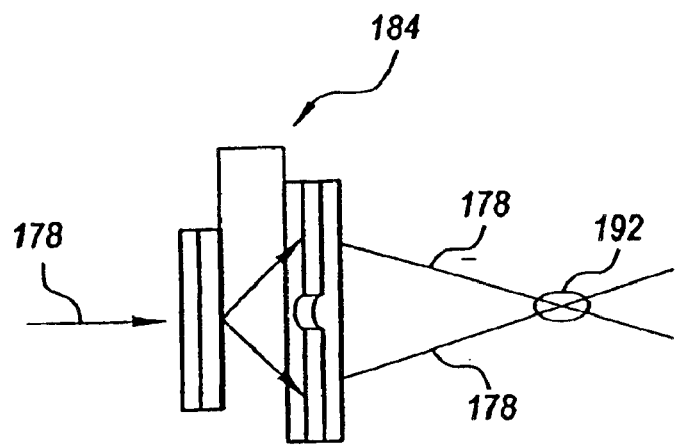
FIG. 8 is a detail view of a holographic beam splitter used in a flow meter according to an embodiment of the present invention.

FIG. 7 shows the optical components of a portable flow meter 170, which are integrated into a single compact box 172 measuring, for example, about 110×80×20 mm. A quartz measurement tube 174 having an internal diameter between about 3.0 to 3.5 mm, for example, is encased in a protective sheathe and passes axially through the center of the box 172. In use, the measurement tube 174 in inserted into the vehicle fuel pipeline between the fuel tank, or fuel pump, and the injector 116. Mounted within the box 172 is a laser diode 176 which emits a laser beam 178 through a collimating lens 180 to a prism 182, which redirects the beam 178 in a direction normal to the axis of the tube 174. The beam 178 passes through a holographic splitter 184, shown in FIG. 8, which splits the beam into two beams focused to intersect in a control measurement volume 192 in the center line of the tube 172. Light is scattered by micro-bubbles in the fuel, and focused by lens 186 through a pinhole mask on PIN diode 188, which is mounted on pre-amplifier board 190. The output from the pre-amplifier board 190 may then be routed to an interface board 138 and processor 140 as described above. Triggering of clock pulses may be accomplished through an external controller 120 for gasoline FIS, or through a custom controller for diesel FIS for the reasons described above.

Figure 9:
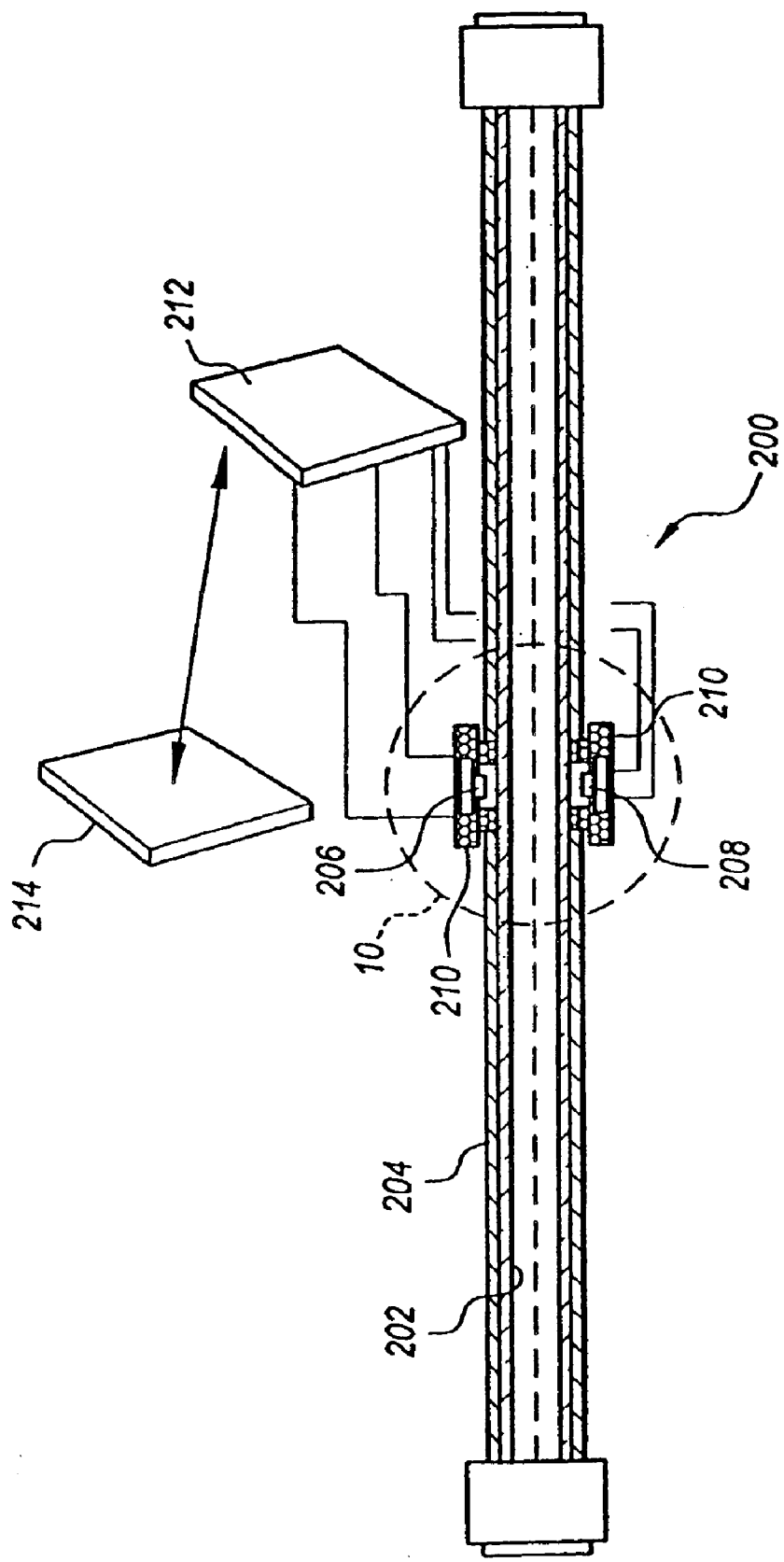
FIG. 9 is a diagrammatic view of an on-board flow meter sensor according to an embodiment of the present invention.

FIGS. 9 through 14 show an on-board fuel flow meter sensor 200 which may be installed as original equipment or as an after-market modification in a motor vehicle. Referring to FIG. 9, the on-board low meter 200 includes a cylindrical quartz measurement tube 202 of about (for example) 300 to 350 mm in length and between 3.0 and 3.5 mm in diameter which is encased in a steel sheathe 204 and inserted in the fuel pipeline between the fuel tank, or fuel pump, and the fuel injector. The laser-Doppler anemometer (LDA) optical components include, for example, a laser diode 206 (832 rim, 18 mW) to emit the laser beam and a PIN diode detector 208 which are mounted in protective casings 210 in openings defined in the steel sheathe 204 on opposite sides of the measurement tube 202. The laser diode 206 and PIN diode 208 are electrically connected to interface board 212. The interface board 212 may be a separate component electrically connected to the Electronic Control Unit (ECO) 214, or may be made integral with the ECU 214. The ECU 214 includes a processor either integral with the ECU 214 or connected to the ECU 214 which is programmed to compute volumetric and/or mass flow rates and other data which the ECU 214 uses in connection with other sensor data input (e.g., load as determined by engine rpm, emissions data, etc.) to determine, for example, the optimal injection timing and pulse duration.

Figure 10:
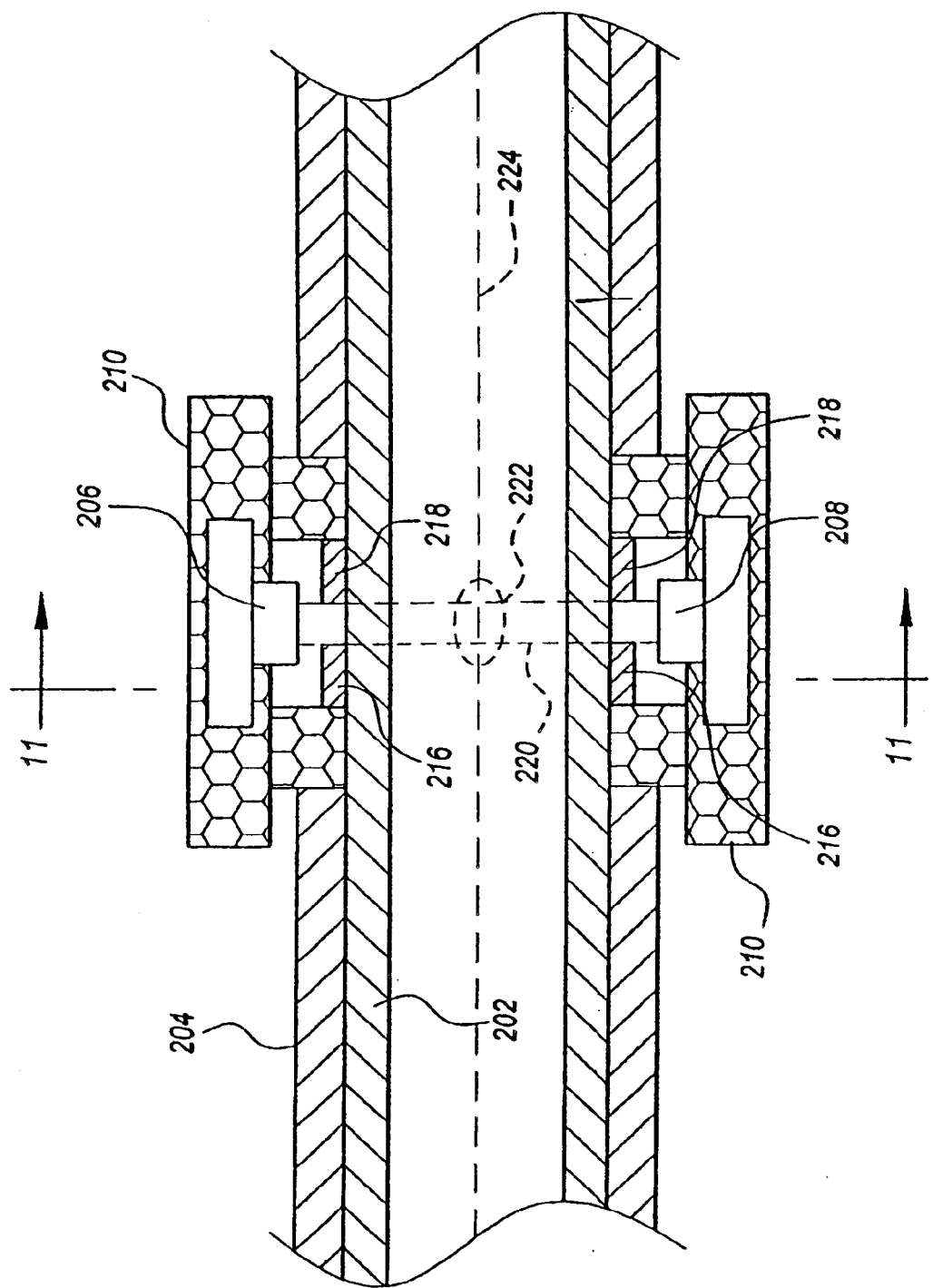
FIG. 10 is a detail view of the on-board flow meter sensor of FIG. 9.
Figure 11:
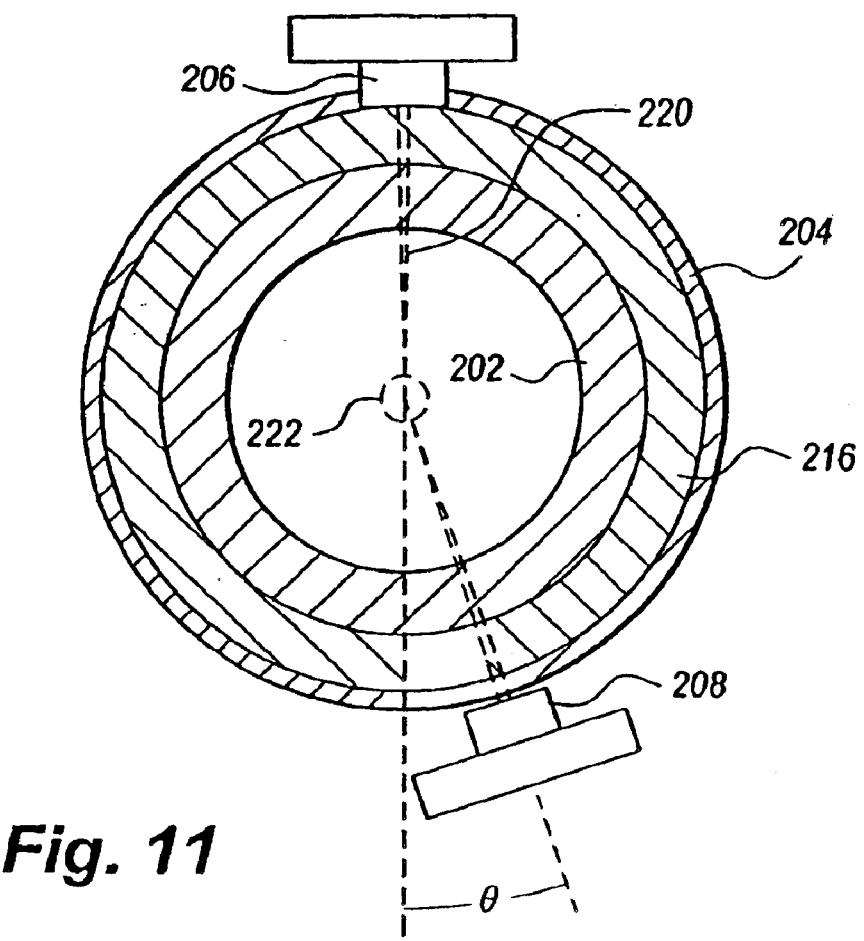
FIG. 11 is a section view along lines 11—11 of FIG. 10.

As shown in FIGS. 10 and 11, disposed in the opening defined in the steel sheathe 204 are two thin cylindrical rings 216 and 218, respectively, which encircle the quartz measurement tube 202 and are separated by a gap of between about 150 and 180 $\mu$m (for example) in order to restrict emission of the laser beam(s) 220 to a narrow plane or laser sheet about 150 $\mu$m thick (for example). The laser diode 206 is positioned to direct the beam(s) 220 normal to the longitudinal axis of the measurement tube 202 and across a diameter of the tube 202. The PIN diode 208 detector is not positioned exactly 180° opposite the laser diode 206, but is radially offset from the diameter by an angle $\theta$ of about 18° (for example) to detect scatter from the intersection of the split beam 220 in the control measurement zone 222 in the center line 224 of the measurement tube 202.

Figure 12:
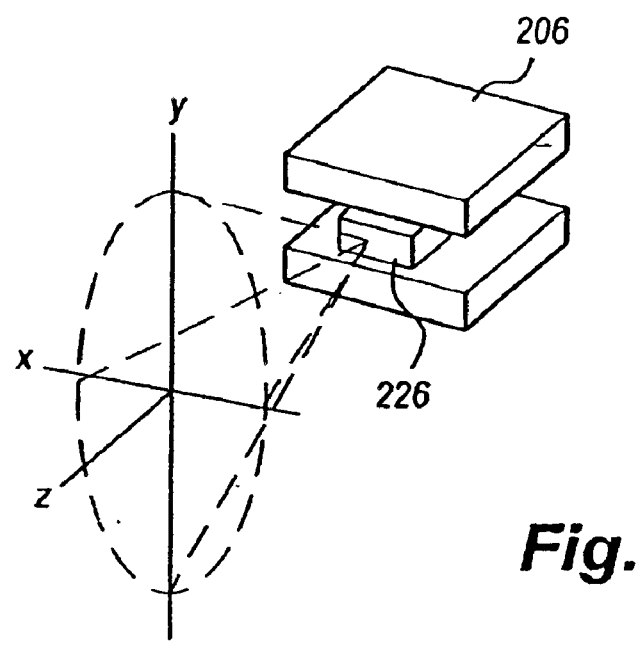
FIG. 12 is a diagrammatic perspective view of the elliptical cone shaped laser beam emitted by the laser diode according to an embodiment of the present invention.

As shown diagrammatically in FIG. 12, the laser diode 206 has an emitting semiconductor layer in a generally rectangular Fabry-Perot cavity which presents a crystal emitting stripe 226 of about 5 $\mu$m (for example) that emits a highly divergent beam in an elliptical cone which may be considered in an XYZ coordinate system, with the X direction indicating lateral deflection, the Y direction indicating vertical deflection, and the Z direction indicating translational distance from the diode 206.

Figure 13:
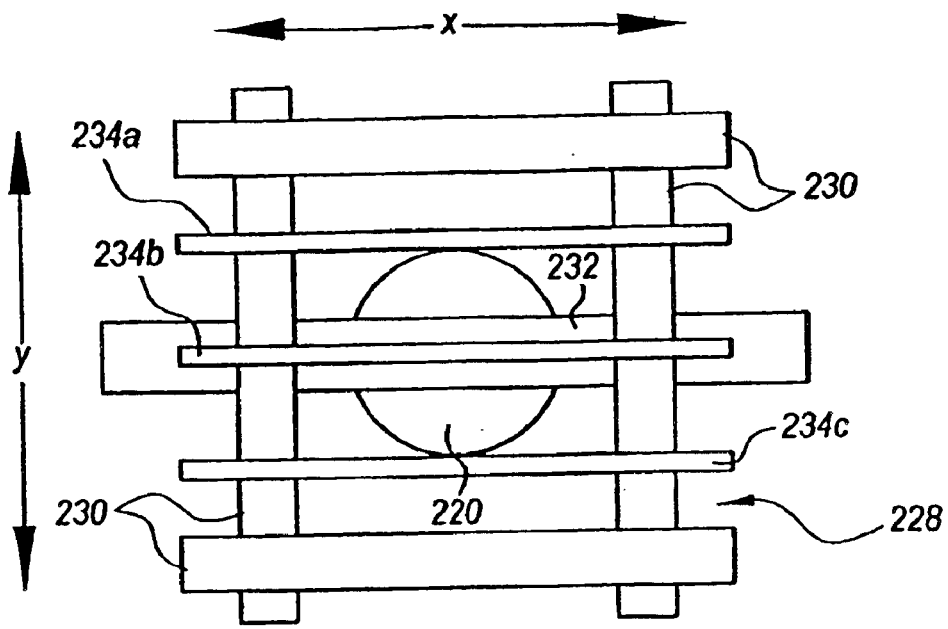
FIG. 13 is a view of a divergence mask used for the transmitting laser diode of FIG. 9.

In order to collimate and split the beam 220, a divergence mask 228, shown in FIG. 13, is used. The mask includes a rectangular X-Y traverse frame 230 on which an optic fiber or wire 32 having a diameter of about 10 $\mu$m (for example) is mounted. The frame 230 is mounted so that the optic fiber 232 is positioned about 1.6 to 1.7 times the diameter of the fiber from the diode (for example) and extends parallel to the crystal emitting stripe 226 normal to the beam 220. This geometry results in an excellent splitting of the beam in a number of "prism-like or pin-gap like" orders, symmetrically discharged in the Y plane, indicated by the Y arrows in FIG. 13, from which the minus and plus first order beams are selected for the LDA measurement. The geometry also results in beams 220 which are well collimated in the X plane, indicated by the X arrows in FIG. 13, which is important to conserve laser light energy. In order to make precise adjustments, the X-Y frame 230 is mounted on the emitting substrate 206 in such manner as to permit the optic fiber 232 to move linearly and rotate slightly in the X-Y plane. Also mounted on the frame 230 is a three-wire guitar 234a, 234b, and 234c with a highly back-reflecting surface to block direct propagation of the zero order and plus/minus second orders of the split beam 220. The divergence mask 228 focuses the split beam 220 to intersect in the control measurement zone 222 on the center line 224 of the measurement tube 202. Only light propagated in the Z plane reaches the detector 208 optics.

Figure 14:
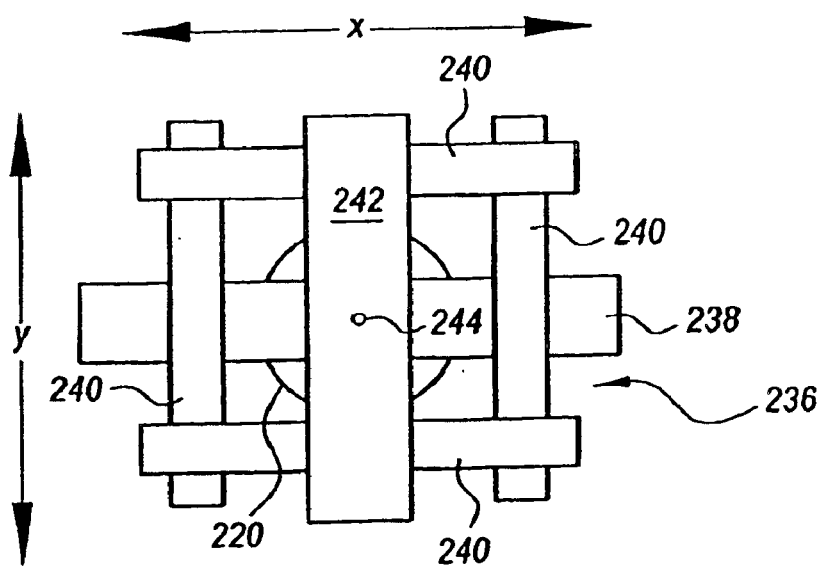
FIG. 14 is a view of a mask used for the PIN diode detector of FIG. 9.

A similar mask 236, shown in FIG. 14, is used in front of the PIN diode detector 208. The mask 236 also has an X-Y traverse frame 240 on which an optic fiber 238 of 18 μm diameter (for example) is mounted is described above. The frame 240 is mounted on the PIN diode substrate 208 so that the optic fiber 238 is positioned at a distance of about 2.1 times the diameter of the optic fiber 238 from the PIN diode 208 surface (for example). Also mounted on the frame 240 between the PIN diode 208 and the optic fiber 238 is an aluminum plate 242 with a pinhole 244 about 50 μm in diameter (for example) defined therein to focus the scattered laser beam 220 on the PIN diode 208.

Figure 15:
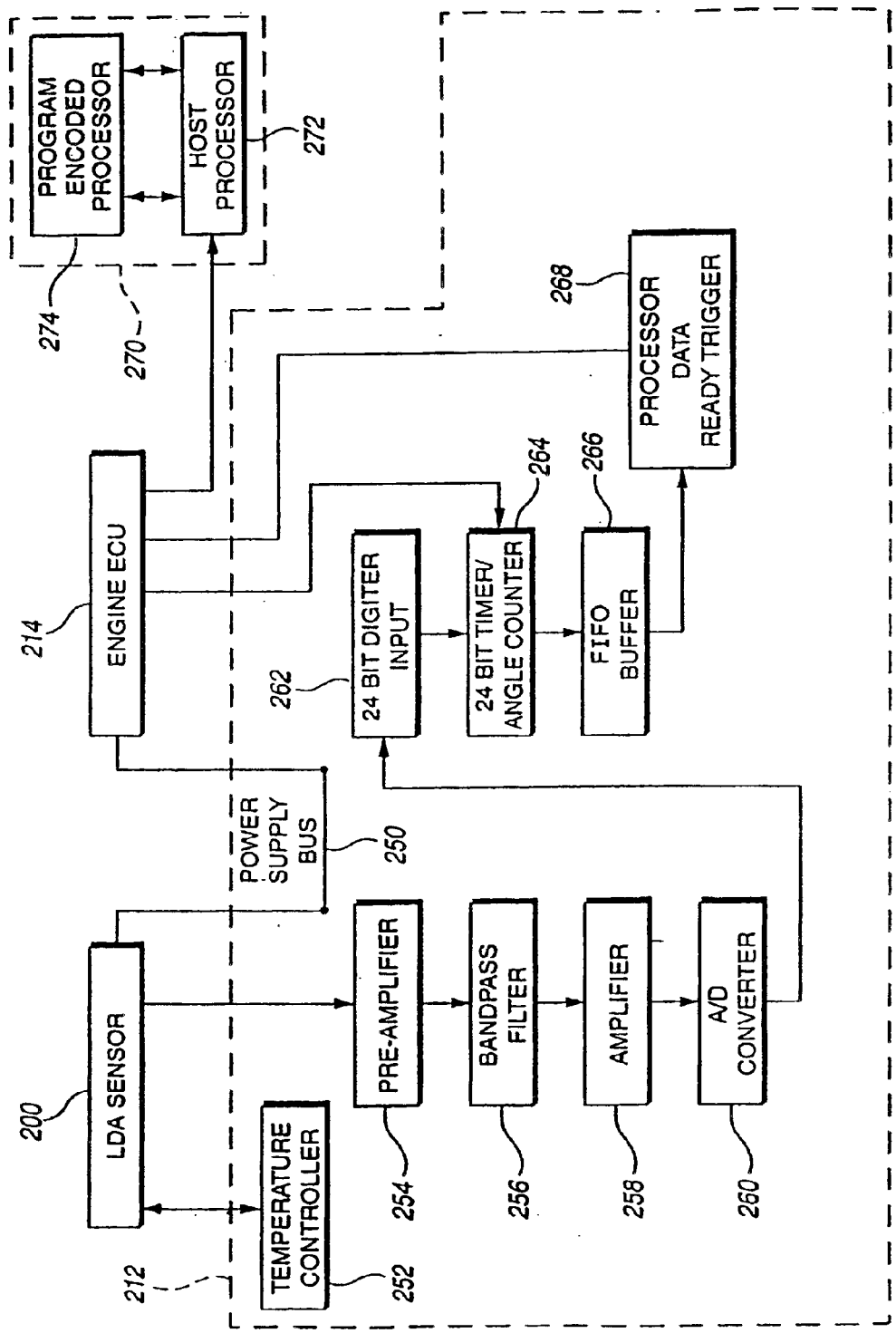
FIG. 15 is a block diagram of a custom interface board (e.g., for use with a flow meter sensor associated with a diesel fuel injection system ("FIS")) according to an embodiment of the present invention.

FIG. 15 shows a block diagram of an interface board 212 for use with the on-board flow meter sensor, with the stationary stand, and/or with the portable flow meter (e.g., when used to test diesel FIS). The interface board 212 includes a power supply bus 250 which receives power from the ECU 214 for supplying power to the various circuits and components on the interface board 212, as well as power for the laser diode 206 and pin diode 208 in the on-board sensor 200. The interface board 212 includes various temperature controller circuitry 252 for receiving temperature sensor data from the laser diode 206 and PIN diode 208, and for controlling the temperature of the laser diode 206 and PIN diode 208 by controlling the current. The raw analog LDA sensor input is applied from the PIN diode 208 in succession to a pre-amplifier circuit 254, a bandpass filter 256 for screening out noise frequencies, an amplifier with adjustable gain 258, an analog to digital (A/D) converter 260, and a 24-bit parallel digital input circuit 262 to format the input for a 24-bit timer/angle counter 264 which receives clock and reset pulses from the ECU 214. The counter's 264 output is transferred to a first-in first-out (FIFO) buffer 266 and then to a processor data ready trigger 268 which serves as a register for transferring the velocity data U(t) to a processor 270 via the ECU 214. The individual circuits and components comprising the interface board 212 are conventional, and will not be described further.

The processor 270 may be a separate board, or it may be made integral with the ECU 214. The processor 270 includes a host instantaneous flow rate meter processor 272 which receives the velocity data U(t) as well as other input parameters (e.g., injection fluid temperature T(t) and pressure P(t), angular velocity (w) and injection duration t(t)) and calls the software program encoded on a custom integrated circuit processor 274 which calculates instantaneous volumetric flow rates, mass rates, and/or other sensor data which are input to the ECU 214 via the host processor 272 as data for calculating the optimal fuel injection timing and pulse duration.

Figure 1B:
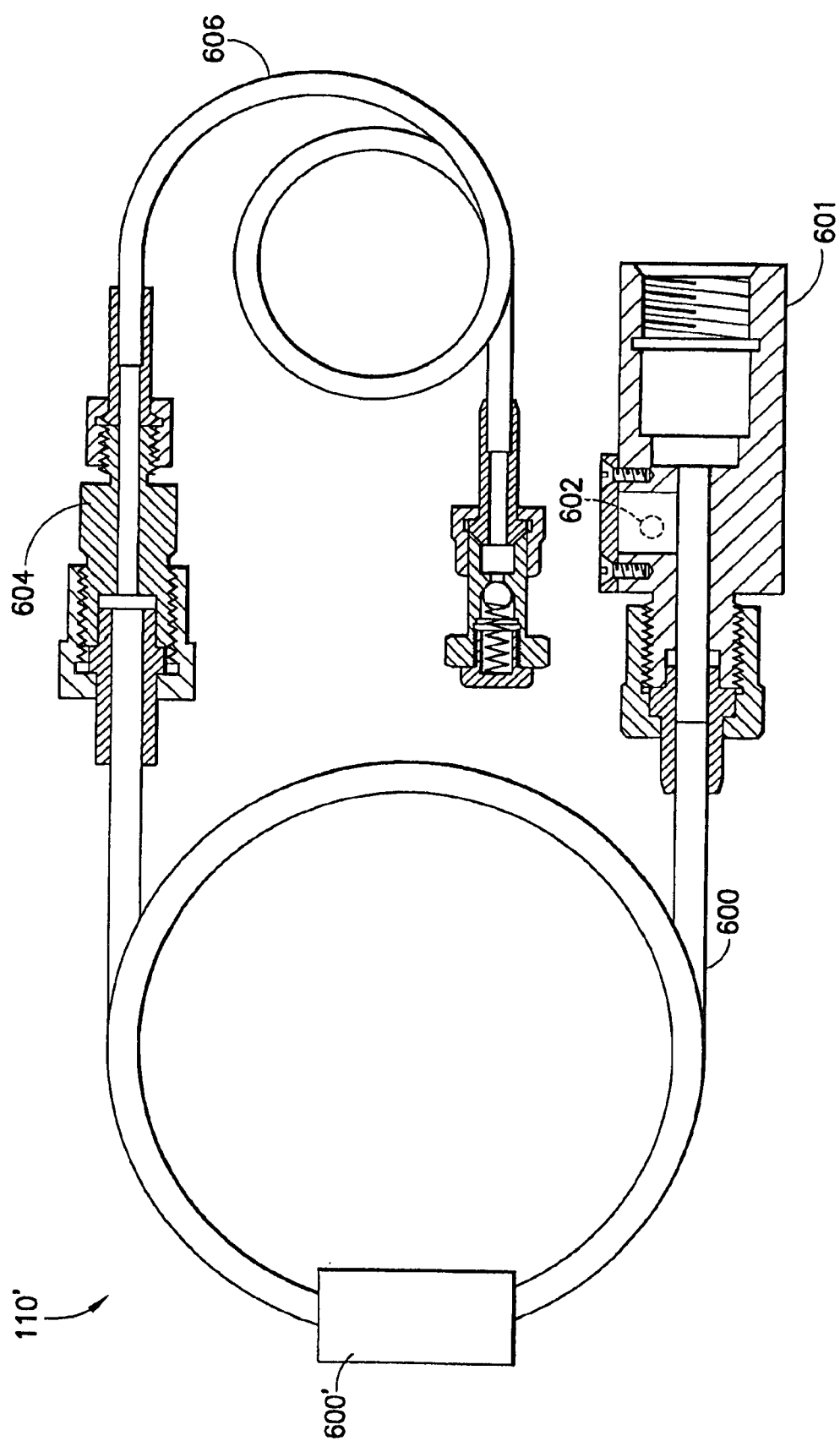

Referring now to FIG. 1B, another embodiment of the present invention is shown. As seen in this FIG. 1B, the flow meter (i.e., stationary stand 110') may be part of an injection test and/or calibration machine. The stationary stand 110' may comprise two subsystems: a high-pressure hydraulics (HPH) subsystem directly related to the specified FIS and a laser Doppler anemometry (LDA) subsystem. These subsystems may be incorporated and operated as a single test unit that performs very accurate volumetric and/or flow rate measurements.

In this embodiment, the LDA measurement is taken in connection with the fuel expelled from the injector into a pipe 600. The flow itself represents an oscillatory fuel with a dense flow of micro-size (e.g., 1–5 μm) bubbles as the result of a cavitation process during discharge of the fuel throughout the injector nozzles. This "bubbled" flow would be quickly dissipated along the pipe 600; therefore, it may be necessary to maintain pressure into the pipe 600 in order to keep cavitation flow along the injector tip a certain distance where the LDA measurement may be reliably made.

In any case, as seen in this FIG. 1B, the stationary stand 110' may include a well-sealed injection tip holder 601 (with a pressure transducer 602); an orifice plate 604 to maintain the average pressure level (e.g., over 40 and up to 100 bar, i.e. a cavitation flow "freezing" condition); a pipe extension 606 to damp remaining flow before the fuel discharge (e.g., into free space for mass balance measurement); and a check valve 608 (e.g., to control backpressure). Changes in injection rate cause changes in pressure of the measurement pipe inlet and in flow therethrough. The backpressure may be setup by adjusting the check valve 608. The backpressure damping may be dependent on the pipe length, inner diameter, and injection repetition rate—it is widely varied upon multi-burst injection mode. One important aspect is related to cycle-to-cycle variability of the fuel injection equipment ("FIE") itself. The repeatability of injection characteristics should be provided by the FIE original pressure control and injection timing equipment.

In one example, the following should be known or determined:

1. Original FIE properties should be available based on independent measurements of fuel discharge amount and injection/nozzle pressure timing, for instance using a positive displacement flow measurements. The injection maps should be obtained at all practical injection repetition rates (RPM) and loads (partial and full).

2. The pressure spectra should be obtained incrementally along the pipe length in order to evaluate cavitation flow length limit $L_{DFM}$.

3. Within $L_{DFM}$ a series of LDA setups should be tested to have data rate over 10 kHz.

4. The time-arrival and cyclic series should be processed to estimate accuracy limit.

5. Both HPH and LDA sub-systems should be well aligned to reach targeted accuracy (e.g., 0.1–0.5%).

Still referring to FIG. 1B, the following example (which example is intended to be illustrative and not restrictive) is provided: The pipe 600 may wound as a rectangular (or oval) tin-plated steel tubing to be installed into the given test machine space, approximately of 5"×10". The total length of pipe may be about 15 to 25 m with inner diameter of about 4 to 6 mm. One turn of these wounds may be used for installation of the measurement section 600' with a flexibly adjusted size, approximately of 2"×5", using high-pressure fitting in-/outlet connections. A strain gauge (or any other type pressure sensor 602) may be installed into the injector tip holder for measuring injection pressure trace (intensity and/or phasing). A digital oscilloscope (for example, a Yokogama DL 1520 type), may be used for the pressure data acquisition. The pressure in the range of 0–100 bar may be precisely controlled by the check valve 608. The check valve 608 may be mounted at the end of the pipe extension 606. The backpressure may be monitored by a liquid-filled Bourdon tube pressure gauge (or pressure sensor) with a reasonable accuracy (e.g., ~1–3%). The fuel ejected from the check valve 608 may be accumulated into a mass-balance glass-vessel (not shown) for reference calibration.

Referring now to the LDA subsystem of FIG. 1B, any desired LDA system may be used. The LDA may be applied to measure centerline velocity of the fuel flow passed through the quartz tube installed into the measurement intersection 600'. The measurement and post-processing procedures both for laminar and turbulent flows are described elsewhere in this application.

In one example (which example is intended to be illustrative and not restrictive), the flow meter must be properly configured for measurement of centerline velocity in a capillary reversible flow (diesel injection) into the range of −5 to +20 m/s (Bragg cell frequency shift alignment) with already seeded (cavitation) particles of 1–5 $\mu$m. The specific design parameters for this example are as follows:

1. Separated transmitting (half intersection angle<15 deg) and receiving heads with minimum available sizes must be installed in off-axis geometric plane.
2. Effective emitting laser power per each of two beams must be more than 15 mW to have enough power of the scattering light on diode-based compact photo-detector. If laser power output from the transmitting lens is more than 60 mW, the backscattering optics can be used for photo-detecting of scattered light.
3. Synchronization of the signal processor with en encoder signal is setup to process data as a cyclic series.
4. Synchronized external pressure trace input through multi-channel interface is fed to adjust any time phase constant delays between the LDA signal output and the injection electronic setup.

Figure 19A:
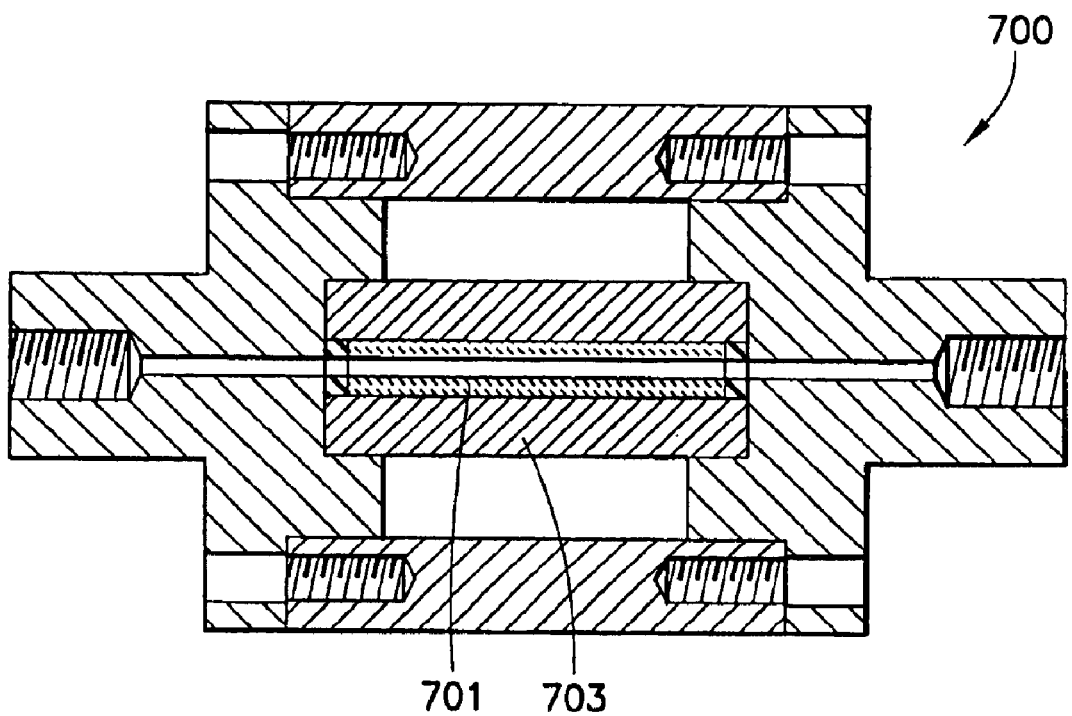
FIGS. 19A and 19B show parts for a flow meter according to an embodiment of the present invention.
Figure 19B:
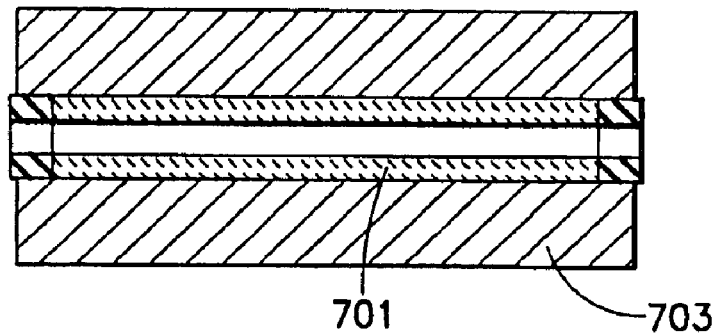
Figure 20A:
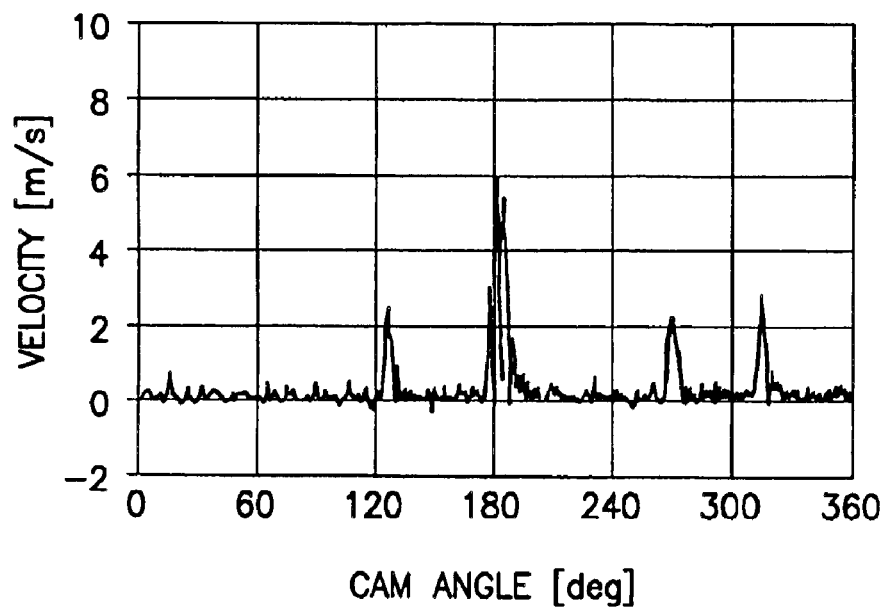
FIGS. 20A–20D are charts showing test results generated by a flow meter according to an embodiment of the present invention.
Figure 20B:
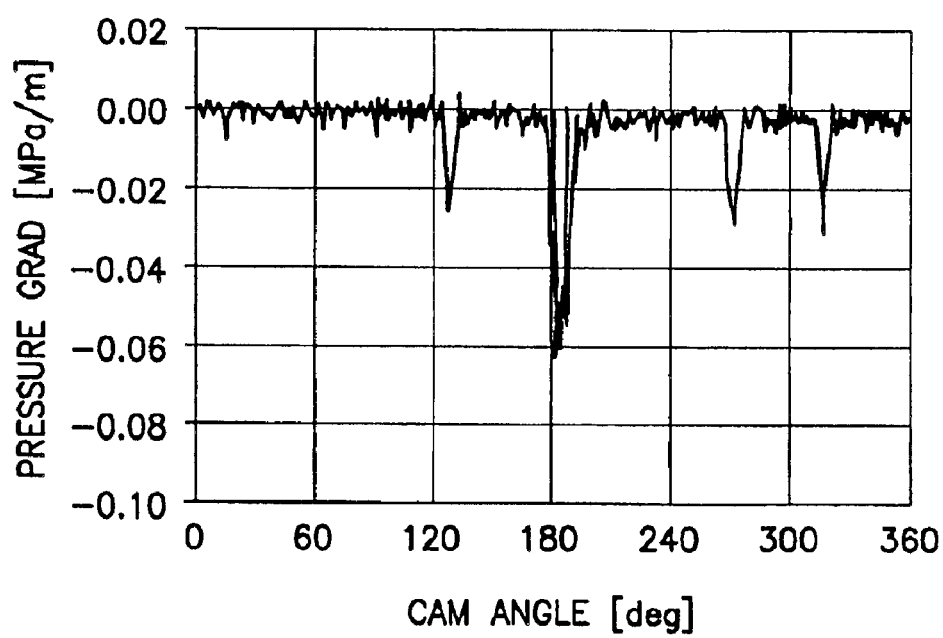
Figure 20C:
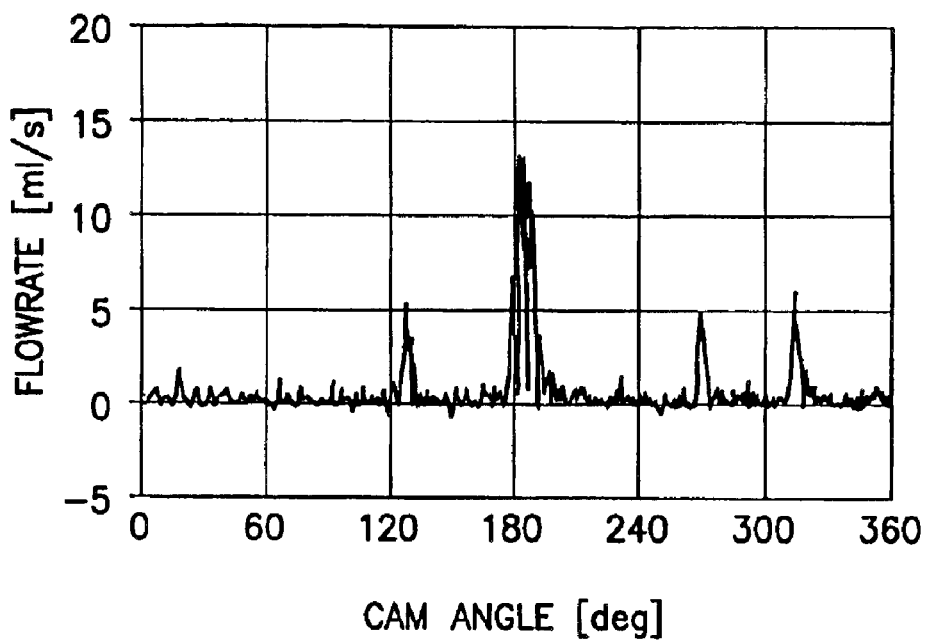
Figure 20D:
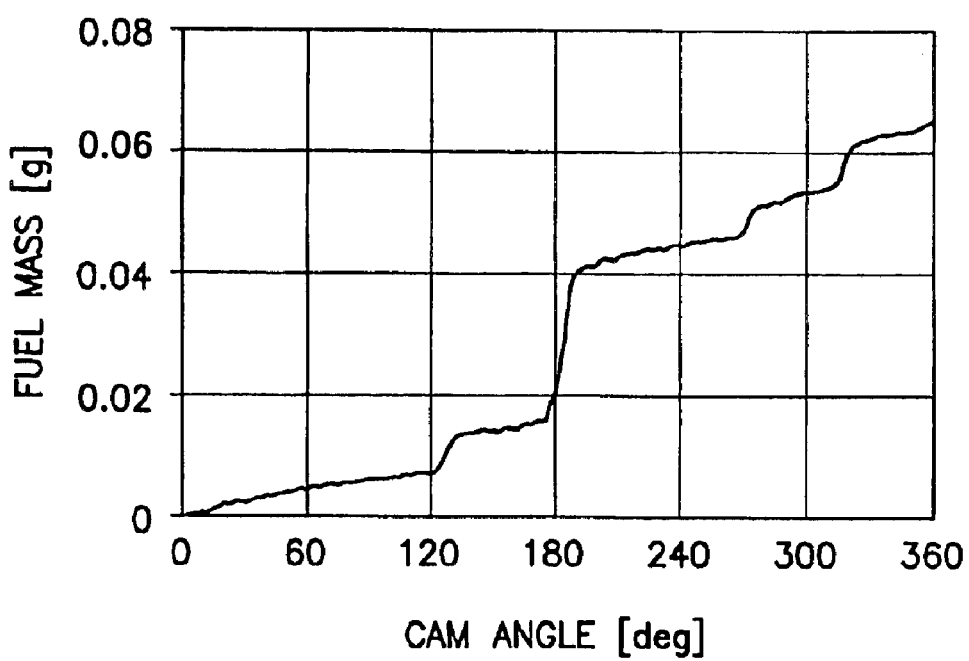

In another example (which example is intended to be illustrative and not restrictive), the incorporation of the LDA may be made in essentially two steps. The first step is design and fabrication of the measurement intersection 600' (MI) itself. The design for an MI operated under injection pressures up to about 100 (MI-100) is described elsewhere in this application, The design of MI-2000 is shown in FIGS. 19A and 19B. Specifically, MI-2000 (identified in FIG. 19A with reference numeral 700) was designed for very high pressures up to about 2000 bar. Its main part is a quartz pipe 701 with an inner diameter of 1.90 mm and outer diameter of 6.06 mm that was thermally pressed into a thick metal tube 703. So, the quartz tube 701 was strengthened due to radial strength from the outer steel tube 703. That enabled it to withstand diesel injection pressures very well (of note, the size of MI-100 and MI-2000 housings can be flexibly changed according to the installation space). The second step is related to precise alignment of the portable LDA optical head on the measurement intersection with respect to the flow axis. That may require fabricating a 2D or 3D mechanism for the flexible alignment and final adjustment of the head and the intersection.

Referring now to FIGS. 20A–20D, some illustrative measurement results associated with stationary stand 110' are shown. More particularly, FIGS. 20A–20D relate to six-shot injection dynamics presented by a cyclic-series, respectively to the Pilot, Pre-Main, Main 1, Main 2, After-M and Post injection events (shots). According to the flow rate measurement, these phases are 124°, 176°, 180°, 185°, 268° and 313°. All events having long dwell intervals before the shot are characterized by almost exact time/angular phase that was electronically set up; there is enough time to recover the pressure drop in the injector accumulation chamber. Vice versa, in the vicinity centered three-shots (Pre-M, Main 1 and Main 2) are set up closely (dwells 300 and 400 $\mu$s), the phases are shifted relative to the initial SOI sets because the pressure needs a recovery time with the delay constant determined by a specific injector design. The sequential injection events can be clearly seen from the accumulated mass series represented by a cascade; the number of cascaded stages is equal to the number of injection shots.

Figures 21A, 21B:
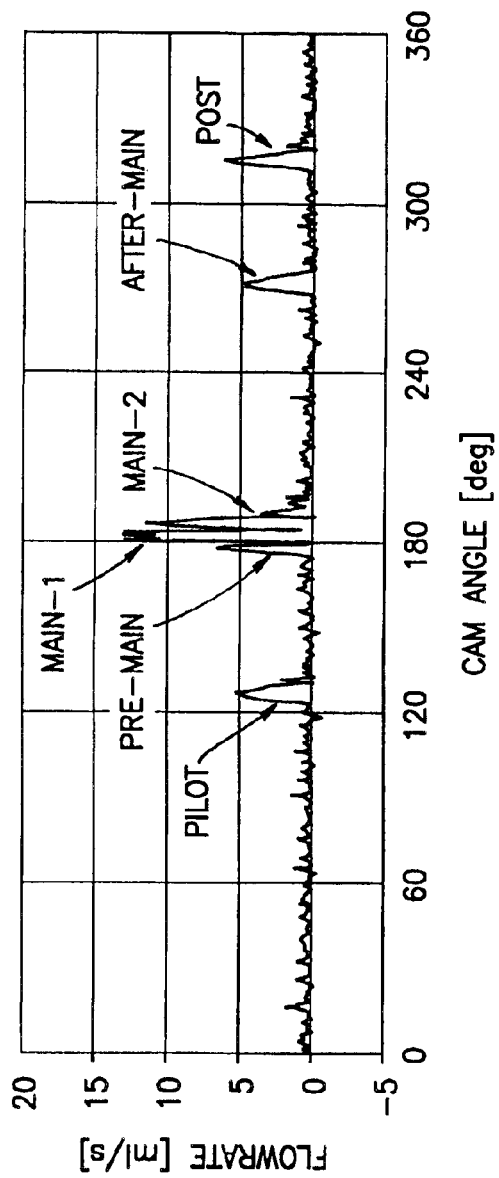
FIGS. 21A and 21B shown additional data relating to the test results of FIGS. 20A–20D.

In order to obtain the fuel masses injected per individual event during multiple injections shown FIGS. 20A–20D, the injection cycle was split into a number of intervals including 6 active injection fractions as shown in the diagram of FIGS. 21A and 21B: Pilot, Pre-Main, Main-1, Main-2, After-Main and Post shots. The results of fuel mass integration (for each injection shot) are reflected in the table of the FIG. 21B. In this particular case, for an injected mass resolution, the smallest amount of fuel, 3.52 mg, was injected during the Pre-Main shot, the largest, 10.58 mg, was during the Main-1 shot. The cyclic resolution was set up at 360 bins per cycle. Increasing it to 3600 bins, the injection mass resolution can be about 1 $\mu$g. However, such a level of control requires a high LDA-data rate (e.g., over 10 kHz).

As seen in FIGS. 20A–20D and 21A–21B, a high data rate allowed resolution of each injection event, i.e., its timing characteristics and masses distributed within the injection cycle. Time arrival- and cyclic- type data were obtained and sorted upon the angular phase and processed to obtain the time/angular resolved series of: (i) flow rate: (ii) pressure gradient; and (iii) integrated mass relating to individual injections. This flow metering system is applicable to any high-pressure FIE (e.g., diesel-based) for the testing of a variety of FIE units including the injector itself. The technique provides a wide dynamic range and high temporal and fuel mass resolution for flow rate measurements. It may be applied to the testing, calibration and/or evaluation of multiple injection diesel equipment.

Whether the instantaneous center line velocity, U(t) data, is measured with the stationary stand 110, the stationary stand 110' the portable flow meter 170, or the on-board sensor 200, the velocity data is input to the processor for processing (e.g., by software) which implements solutions to the Navier-Stokes equations to compute instantaneous volumetric flow rates, mass rates, etc. For a gasoline fuel injection system, the software may implement a solution for one-dimensional laminar flow for any periodically oscillating flow.

According to this method, the instantaneous volumetric flow rate V(t) is expressed as:

$$V(t) = \frac{\pi R^2}{2}\left(\frac{R^2 p_o}{4v} + \sum_{n+1}^{\infty}\left\{\frac{p_n}{n\omega}ie^{in\omega t}\left[\frac{4i^{1/2}J_1(i^{3/2}T_n)}{Ta_n J_0(i^{3/2}Ta_n)} - 2\right] + C.C.\right\}\right) \quad (2)$$

where R is the radius $$o: \sqrt{\frac{\omega n}{v}}$$

measurement tube, v is the kinematic $i=\sqrt{-1}$ viscosity of the fluid, $p_o$ and $p_n$ are harmonic coefficients, w is the angular frequency, t is the time, $Ta_n$ is the nth Taylor number $$Ta_n = R\sqrt{\frac{wn}{v}},$$

and C.C. is the complex conjugate. $J_o$ and $J_t$ are, of course, zero order and first order Bessel functions. The theoretical center line velocity is expressed as:

$$U(r \equiv 0, t) = \frac{R^2 p_o}{4v} + \sum_{n=1}^{\infty} \left\{ \frac{p_n}{n\omega} ie^{in\omega t} \left[ \frac{1}{J_0(i^{3/2}Ta_n)} - 1 \right] + \overline{C.C.} \right\} \quad (3)$$

On the other hand, the measured time series of center line velocities from the LDA measurements in $N_{exp}$ output bins within the period of an injection cycle can be transformed into the Fourier expansion:

$$U(r \equiv 0, t) = \frac{c_o}{2} + \sum_{n=1}^{in\omega p} (c_n e^{in\omega t} + C.C.) \quad (4)$$

The harmonic coefficients $P_o$ and $P_n$ can be determined from equations (3) and (4) as follows:

$$p_o = \frac{2c_o v}{R^2} \text{ and } p_n = \frac{c_n in\omega}{1 - \frac{1}{J_o(i^{3/2}Ta_n)}} \quad (5)$$

The derivation of equations (2) through (5) is explained in Durst et al., supra, except that the equation for $P_n$ is incorrect in Durst (p. 180, equation 12) due to an algebraic error.

Figure 16A:
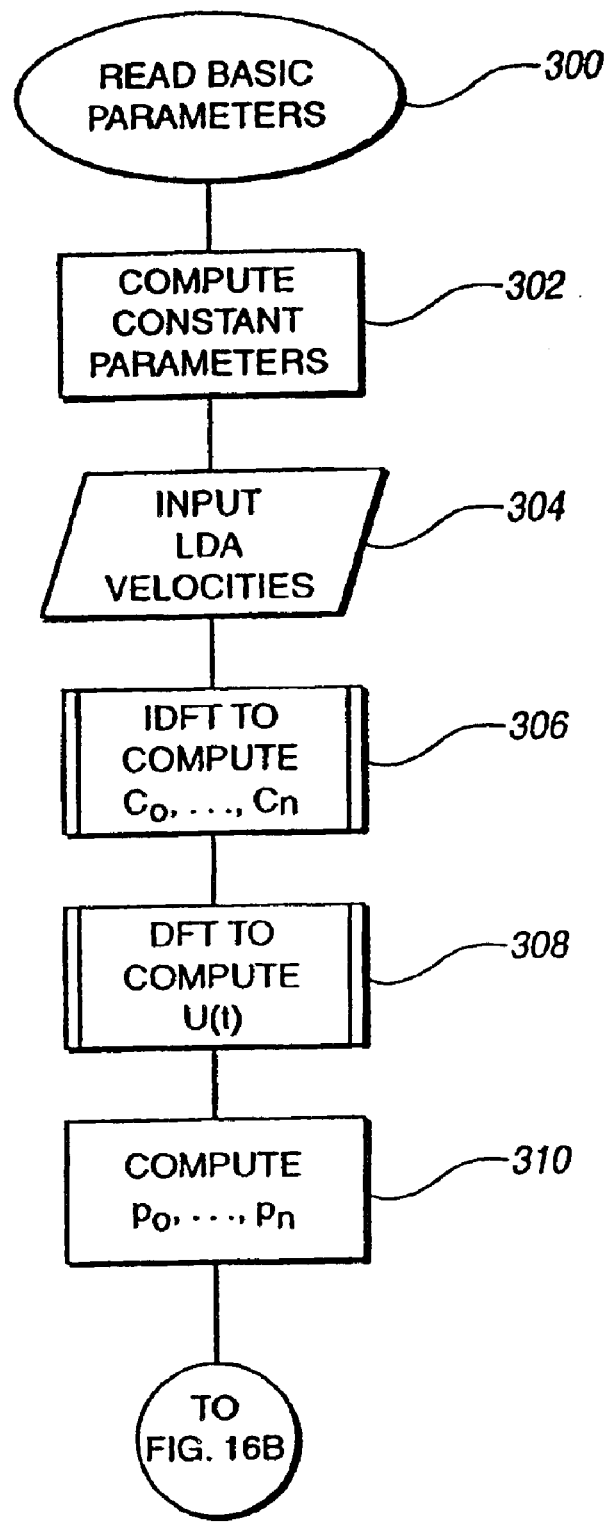
FIGS. 16A and 16B show a flow chart of a first electronic data processing method for transforming center line velocity data into volumetric and mass flow rates in a flow meter according to an embodiment of the present invention.
Figure 16B:
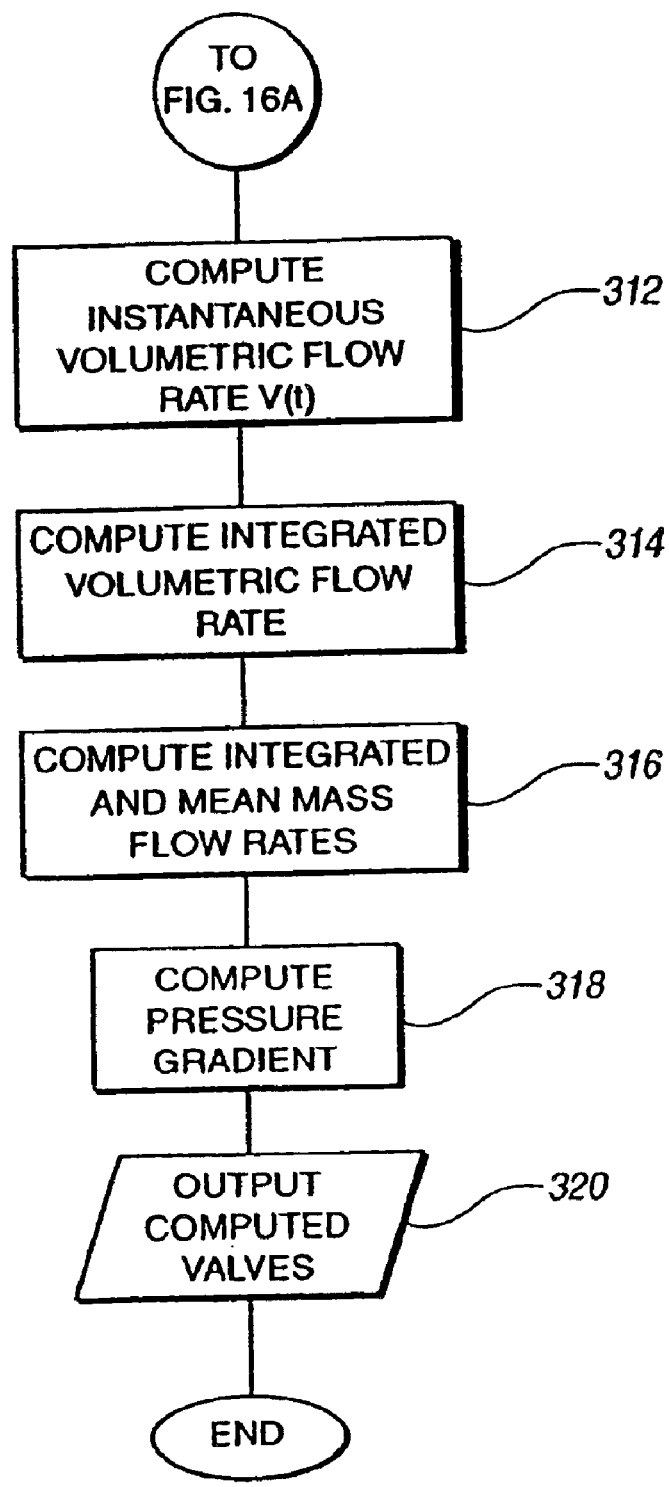

FIGS. 16A and 16B show an exemplary flow chart for a software program for implementing equations (2) through (5). When the processor is a personal computer, the software may be written in any language (e.g., a high level language). In one example (which example is intended to be illustrative and not restrictive), Fortran may be used due to its built in support for complex number arithmetic. When the processor is a custom integrated circuit, the software instructions may be encoded, for example, in ROM and/or an EPROM in assembly language (for example), and/or in dedicated circuitry.

As shown in FIGS. 16A and 16B, certain basic parameters are read 300 or input to the processor, or hard coded into ROM, such as, for example, the injection period T0, kinematic viscosity v, fluid density p, radius of the pipe R, injection duration T, etc. In the next step 302, certain constant parameters can be computed, such as frequency f=1/T0 and angular frequency w=2πf etc. In step 304, the LDA velocities are input to the processor directly (or via the ECU 214, for example). In step 306, the raw LDA velocities u(n) are used o compute the harmonic coefficients $c_0$ and $c_n$ by an inverse discrete Fourier transform (IDFT) of equation (4), i.e., $$c(m) = \frac{2}{N} \sum_{n=0}^{N-1} u(n) e^{im2\pi n/N} \quad (6)$$

where m=0, . . . , N/2 output bins and N is the number of LDA measurements per injection cycle. Only the first M=N/2 output ins are used due to symmetry and due to the fact that the input values are real. In equation (6), the factor 2/N is a scaling factor to correct the amplitude.

In step 308, a forward discrete Fourier transform DFT:

$$U(n) = \frac{c_o}{2} + \sum_{m=1}^{N=N/2} c(m) e^{-im2\pi n/N} \quad (7)$$

where n=0, . . . , N is used to calculate the velocity series according to equation 4. In step 310, the values of $p_0$ and $p_n$ are determined using equation (5) and the values of $c_0$, . . . $c_n$ previously calculated in step 306. In step 312, the instantaneous volumetric flow rate V(t) is calculated using equation (2) and the values of $p_0$, . . . ,$p_n$ previously calculated in step 310.

In step 314 the integrated volumetric flow rate is obtained by summing the instantaneous volumetric flow rates and dividing the sum by the number of samples N. In step 316 the integrated mass flow rate is obtained by multiplying the integrated volumetric flow rate by the density p and the mean mass flow rate is obtained by multiplying the first term of the Fourier volumetric flow rate series V(t) by the density p. Optionally, at step 318, the instantaneous-pressure gradient series may be obtained by solving:

$$\frac{\partial p}{\partial z} = -\rho \left[ p_o + \sum_{n=1}^{\infty} (p_n e^{in\omega t} + C.C.) \right] \quad (8)$$

which is the time series P_Z (In) where $$P\_Z(\ln) = -\rho \left[ p_o + \sum_{j=1}^{N/2} p(j) e^{ij2\pi \ln/N} \right] \quad (9)$$

At step 320, the program outputs the computed values, either to a display device, or to the ECU 214.

The effectiveness of the solution for one-dimensional laminar flow for any periodically oscillating flow is limited by the Reynolds number $Re_\delta \leq 700$ where the Stokes layer thickness $\delta = \sqrt{2v/w}$ limits application of the method. The effect of this limitation is that the software solution described in FIGS. 16A and 16B may be essentially limited to gasoline direct injection engines (which have a lower injection pressure than diesel fuel injection systems).

In order to obtain accurate flow meter calculations of the volumetric flow rate in diesel fuel injection systems, a more exact solution of the Navier-Stokes equations for turbulent flow in a circular pipeline may be required. The z-momentum and r-momentum Navier-Stokes equations are:

$$\frac{\partial(\rho \bar{u})}{\partial t} + \frac{\partial}{\partial z}(\rho \bar{u} \bar{u}) + \frac{1}{r}\frac{\partial}{\partial r}(r\rho \bar{v} \bar{u}) = -\frac{\partial \bar{p}}{\partial z} + \frac{\partial}{\partial z}\left(\mu \frac{\partial \bar{u}}{\partial z}\right) + \frac{1}{r}\frac{\partial}{\partial r}\left(r\mu \frac{\partial \bar{u}}{\partial r}\right) \quad (10)$$

$$\frac{\partial(\rho\bar{v})}{\partial t} + \frac{\partial}{\partial z}(\rho\bar{u}\bar{v}) + \frac{1}{r}\frac{\partial}{\partial r}(r\rho\bar{v}\bar{v}) = \qquad (11)$$
$$-\frac{\partial \bar{p}}{\partial z} + \frac{\partial}{\partial z}\left(\mu\frac{\partial \bar{v}}{\partial z}\right) + \frac{1}{r}\frac{\partial}{\partial r}\left(r\mu\frac{\partial \bar{u}}{\partial r}\right) - \mu\frac{\bar{v}}{r^2}$$

respectively, where the tilde overscore denotes the sum of mean and fluctuation parts of the Reynolds decomposition, so that $\bar{p}=P+p'$, $\bar{u}=U+u'$, and $\bar{v}=V+v'$. In high pressure fuel injection pipe flow, the radial partial derivatives are two or three orders of magnitude less than the axial partial derivatives. Therefore, equations (10) and (11) can be simplified to:

$$\frac{\partial(\rho\bar{u})}{\partial t} + \frac{\partial}{\partial z}(\rho\bar{u}\bar{u}) = -\frac{\partial\bar{p}}{\partial z} + \frac{\partial}{\partial z}\left(\mu\frac{\partial\bar{u}}{\partial z}\right) + \frac{1}{r}\frac{\partial}{\partial r}\left(r\mu\frac{\partial\bar{u}}{\partial r}\right) \qquad (12)$$

$$\frac{\partial(\rho\bar{v})}{\partial t} + \frac{\partial}{\partial z}(\rho\bar{u}\bar{v}) = -\frac{\partial\bar{p}}{\partial r} \qquad (13)$$

respectively.

The velocity components may be decomposed to the mean velocity $W=W_{st}+W_{osc}$, where $W_{st}$ is a stationary portion of velocity and $W_{osc}$ is an oscillating portion of velocity, and the fluctuating $W'$, velocity, so that:

$$\bar{u}=U+u'=U_{st}+U_{osc}+u' \text{ and } \bar{v}=V_{st}+V_{osc}+v' \qquad (14)$$

With respect to the pressure, three parts (stationary, oscillating, and fluctuating) are also superposed, so that:

$$\frac{\partial p}{\partial z} = -\rho(P)\left(p_{oz} + \sum_{n=1}^{\infty}(p_{iz}+p'_{iz})e^{in\omega t} + C.C._{pz}\right) \qquad (15)$$

where $P_{oz}$ is the stationary portion of pressure, $P_{iz}$ is the oscillating portion, and p' is the fluctuating portion. The fluid density is a linear compressible term, iterated at each i-step calculation:

$$\rho(P) = \rho(P_o) + \sum_{n=1}^{t} \frac{\partial \rho}{\partial p} d\,P \qquad (16)$$

Using equations (14) and (15), the z-momentum and r-momentum equations (12) and (13) can be rewritten as a system of transport equations, so that the z-momentum is expressed by:

$$\frac{\partial(\rho U)}{\partial t} = \rho(P)\left(p_{\omega i} + \sum_{n=1}^{\infty} p_{iz}e^{in\omega t} + C.C._{pr}\right) + \frac{1}{r}\frac{\partial}{\partial r}\left(r\mu\frac{\partial U}{\partial r}\right) \qquad (17)$$

$$\frac{\partial(\rho u')}{\partial t} + \frac{\partial}{\partial z}(\rho u^2) = \qquad (18)$$
$$\rho(P)\left(\sum_{n+1}^{\infty} p'_{iz}e^{in\omega t} + C.C._{pr}\right) + \frac{\partial}{\partial z}\left(\mu\frac{\partial u'}{\partial z}\right) + \frac{1}{r}\frac{\partial}{\partial r}\left(r\mu\frac{\partial u'}{\partial r}\right)$$

and the r-momentum is expressed by:

$$\frac{\partial(\rho V)}{\partial t} = \rho(P)\left(p_{or} + \sum_{m=1}^{\infty} p_{1r}e^{in\omega t} + C.C._{pr}\right) \qquad (19)$$

$$\frac{\partial(\rho v')}{\partial t} + \frac{\partial}{\partial z}(\rho u' v') = \rho(P)\left(\sum_{n=1}^{\infty} p'_{ir}e^{in\omega t} + C.C._{pr}\right) \qquad (20)$$

Equations (17) and (19) may then be integrated in conventional fashion. With respect to equations (18) and (20), the Reynolds scale in high-pressure injection oscillating capillary flow is the Stokes layer thickness $$\delta = \sqrt{\frac{2\nu}{\omega}}.$$

The measurement time span $\Delta t$ is on the order of $\sim 10^{-6}$ s and diesel fuel has a viscosity of about 2 to $4.5 \times 10^{-6}$ m²/s. With respect to such high temporal resolution, the critical space $$\delta = \sqrt{\frac{\nu \Delta t}{\pi}}$$

for detection of the flow fluctuation becomes an order of magnitude of $10^{-6}$ m, which is comparable with the optic interference fringe span $\Lambda$. Within such a very short time interval, the fluctuation of the velocity may be considered "frozen", as well as the liquid density. With these simplifications and manipulation with transfer functions, equations (18) and (20) may be further simplified and combined with the integration of equations (17) and (19) to produce the full solution for the velocity components, with the z-momentum expressed as:

$$\tilde{u} = \frac{R^2 p_{oz}}{4\nu}\left(1 - \frac{r^2}{R^2}\right) + \qquad (21)$$

$$\sum_{n=1}^{\infty}\left(\frac{p_{nz} - \frac{p'_{nz}}{2}}{n\omega}ie^{in\omega t}\left(\frac{J_0\left(i^{3/2}Ta_n\frac{r}{R}\right)}{J_4(i^{3/2}Ta_n)} - 1\right) + C.C._U\right)$$

and the r-momentum expressed as:

$$\tilde{v} = \frac{R^2 p_{or}}{4\nu}\left(1 - \frac{r^2}{R^2}\right) + \qquad (22)$$

$$\sum_{n=1}^{\infty}\left(\frac{p_{nr} - \frac{p_{nr}}{2}}{n\omega}ie^{in\omega t}\left(\frac{J_0\left(i^{3/2}Ta_n\frac{r}{R}\right)}{J_0(i^{3/2}Ta_n)} - 1\right) + C.C._U\right)$$

In order to obtain the instantaneous volumetric flow rate over m pipe cross section in the direction of the pipe axis, it is necessary to integrate the $\bar{u}$ velocity component and turbulent velocity correlation $\sqrt{\overline{u'v'}}$ projected on the same pipe axis as follows:

$$\dot{V}(t) = 2\pi \int_0^R \left(\bar{u} + \sqrt{\overline{u'v'}}\right) r dr = \frac{\pi R^2}{2}\left[\frac{p_o R^2}{4\nu} + \qquad (23)\right.$$

$$\sum_{n=1}^{\infty}\left[\frac{p_{nz}-\left(\frac{p'_{nz}}{2}+\frac{\sqrt{p'_{nz}p'_{nx}}}{2}\right)}{n\omega}ie^{in\omega t}\left\{\frac{4i^{1/2}J_1(i^{3/2}Ta_n)}{Ta_nJ_0(i^{3/2}Ta_n)}-2\right\}\right]+$$

$$C.C.$$

This flow rate reflects an effective axial velocity composing our terms, i.e., a stationary part associated with $p_{oz}$, an oscillatory part associated with $p_{nz}$' a u-pulsation part associated with $p_{nz}$' and a uv-pulsation part associated with $p_{nz}p_{nz}$:

$$\tilde{u}_{af} = \left[\frac{R^2 p_{oz}}{4v}\left(1-\frac{r^2}{R^2}\right)+ \right. \tag{24}$$

$$\sum_{n=1}^{\infty}\left(\frac{p_{nz}-\left(\frac{p'_{nz}}{2}+\frac{\sqrt{p'_{nz}p'_{nx}}}{2}\right)}{n\omega}ie^{in\omega t}\left\{\frac{J_0\left(i^{3/2}Ta_n\frac{I}{R}\right)}{J_0(i^{3/2}Ta_n)}\right\}\right]$$

then this velocity is measured on the centerline, r↑0, equation 24 reduces to:

$$\tilde{u}_{cf} = \tag{25}$$

$$\frac{R^2 p_{oz}}{4v} + \sum_{n=1}^{\infty}\left(\frac{p_{nz}-\left(\frac{p'_{oz}}{2}+\frac{\sqrt{p'_{nz}p'^2_{nf}}}{2}\right)}{n\omega} - ie^{in\omega t}\left\{\frac{1}{J_0(i^{3/2}Ta_n)}-1\right\}\right)$$

The experimentally measured center line velocity time series may be expressed as the Fourier expansion:

$$U_{LDA}(t) = U_{st} + U_{osc}(t) + U_{puls}(t) = \frac{C_o}{2} + \sum_{n=1}^{F_s} c_n(e^{in\omega t}) + c'_n(e^{in\omega t}) \tag{26}$$

where switching in the Fourier expansion is dependent on the following criteria:

$$n \in [1, N_\delta] \text{ if } \delta_n\sqrt{\frac{2v}{n\omega}} > 10\Lambda \tag{27}$$

$$n \in [N_\delta + 1, N_{meas}] \text{ if } \delta_n\sqrt{\frac{2v}{n\omega}} \leq 10\Lambda$$

Comparing equations (23) and (24) gives final expression for the pressure gradient series, which are needed to compute the instantaneous volumetric flow rate as expressed by equation (23):

$$p_{oz} = 2\frac{c_o v}{R^2} \tag{28}$$

$$p_{nz} = \frac{c_n n\omega i}{\left[1-\frac{1}{J_0(i^{3/2}Ta_n)}\right]}, n \in [1, N_\delta]$$

$$p'_{nz} + \sqrt{p'_{nz}p'_{nr}} = \frac{2c'_n n\omega i}{\left[1-\frac{1}{J_0(i^{3/2}Ta_n)}\right]}, n \in [N_\delta + 1, N_{meas}]$$

Figure 17A:
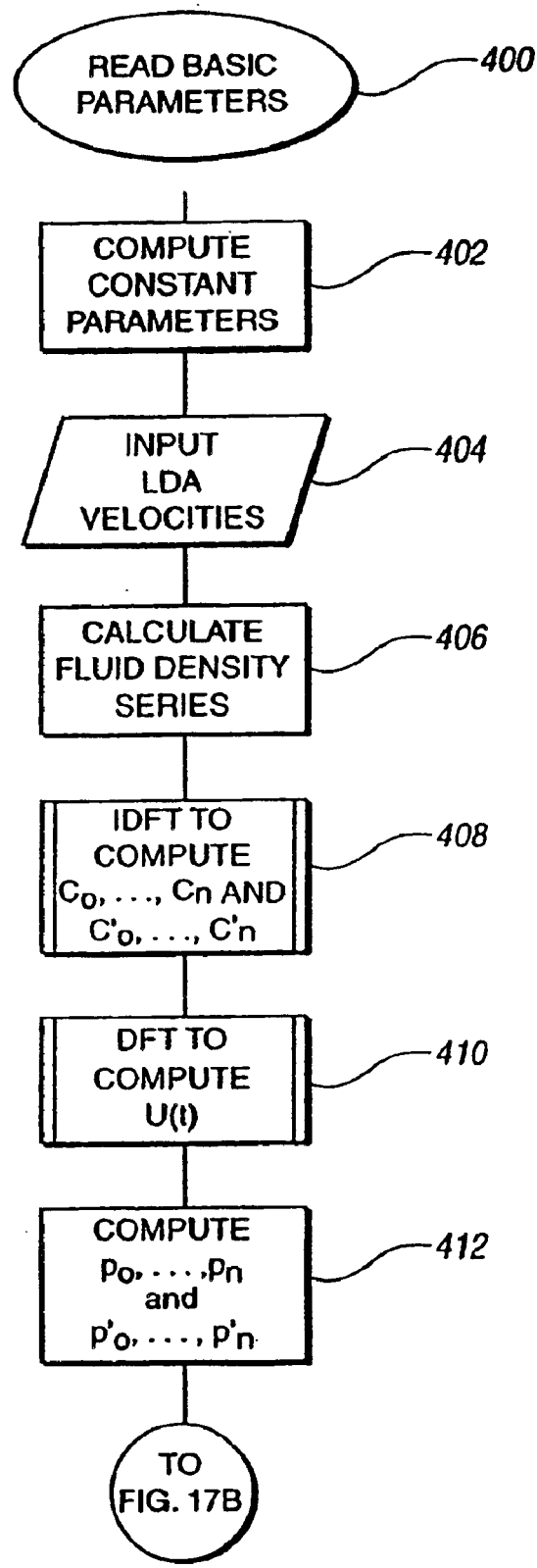
FIGS. 17A and 17B show a flow chart of a second electronic data processing method for transforming center line velocity data into volumetric and mass flow rates in a flow meter according to an embodiment of the present invention.
Figure 17B:
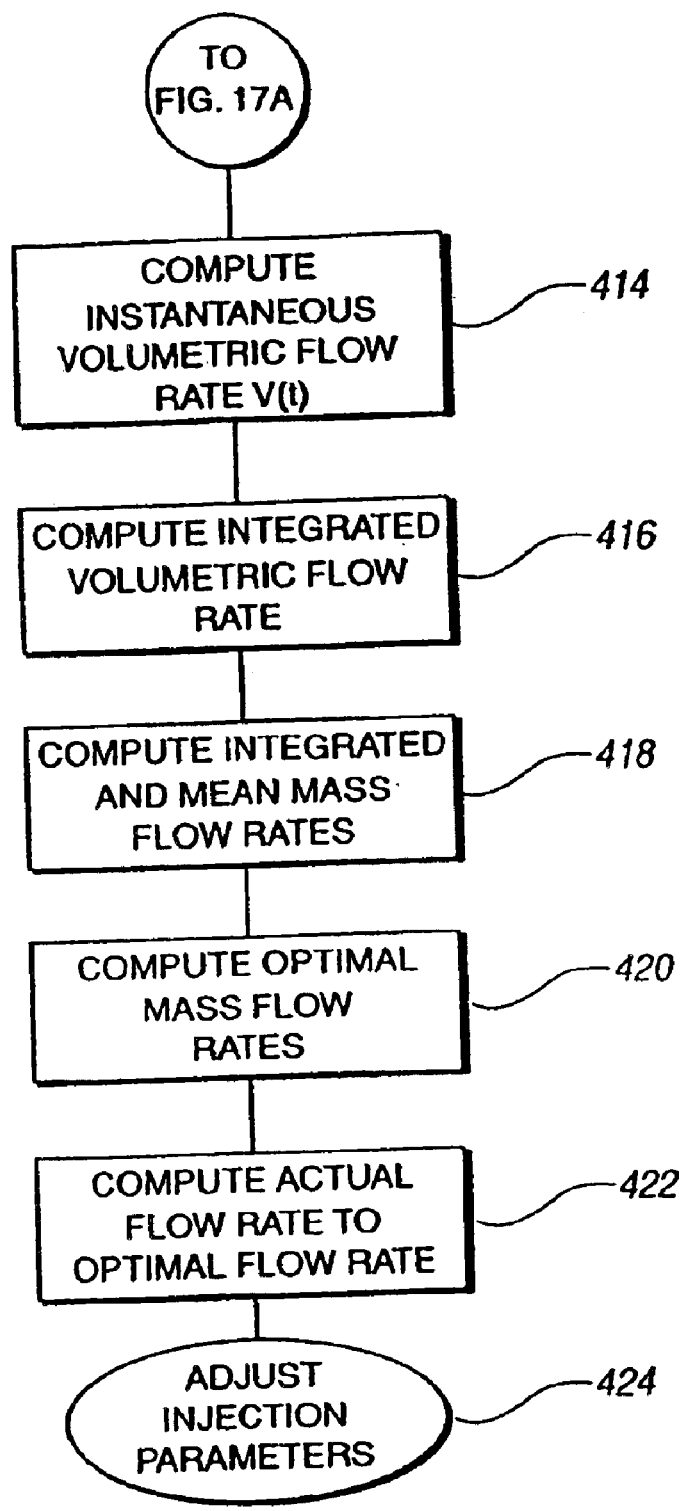

FIGS. 17A and 17B show an exemplary flow chart for a software program for implementing equations (10) through (28). When the processor is a personal computer, the software may be written in any language (e.g., a high level language). In one example (which example is intended to be illustrative and not restrictive), Fortran may be used due to its built in support for complex number arithmetic. When the processor is a custom integrated circuit, the software instructions may be encoded, for example, in ROM and/or an EPROM in assembly language (for example), and/or in dedicated circuitry.

As shown in FIGS. 17A and 17B, certain basic parameters are read 400 or input to the processor, or hard coded into RON, such as the injection period T0, kinematic viscosity v tables where viscosity is a function of temperature, fluid density p tables where density is a function of pressure, radius of the pipe R, injection duration r, etc. In the next step 402, certain constant parameters can be computed, such as frequency f=1/T0 and angular frequency w=2πf, Stokes layer thickness δ, etc. In step 404, the DA velocities are input to the processor directly (or via the ECU 214). For diesel or high pressure fuel injection systems, the number of velocities measured per cycle, $N_{meas}$, may be 10,000, for example. In step 406, the fluid density series is calculated using equation (16). In step 408, the raw LDA velocities u(n) are used to compute the harmonic coefficients $c_o, \ldots c_n$, and $c_o', \ldots, c_n'$ by an inverse discrete Fourier transform (IDFT) of equation (26) analogous to that shown in equation (6), supra, essentially the only difference being that each crank angle n is tested according to equations (27) to determine whether $c_n$ or $c_n$ is incremented. In step 410, a forward discrete Fourier transform DFT, analogous to equation (7), is used to calculate the velocity series according to equation (25). In step 412, the values of $p_o, p_n$, and $p_n$', are determined using equation (28) and the values of $c_o, \ldots c_n$, and $c_o' c_n'$, calculated in step 408. In step 414, the instantaneous volumetric flow rate V(t) is calculated using equation (23) and the values of $p_o, \ldots, p_n$, and $p_0', \ldots, p_n'$ calculated in step 412.

In step 416 the integrated volumetric flow rate is obtained by summing the instantaneous volumetric flow rates and dividing the sum by the number of samples N. During calculation of the integrated volumetric flow rate, the injected fuel mass, in the present cycle, $m_j$, can be obtained from:

$$m_j = \int_0^t V(t) = \frac{T}{N_{meas}-1}\sum_{n+1}^{n_j}\rho_n \dot{V}_n n \tag{29}$$

In step 418 the integrated mass flow rate is obtained by multiplying the integrated volumetric flow rate by the density p, and the mean mass flow rate is obtained by multiplying the first term of the Fourier volumetric flow rate series V(t) by the density p. Optionally, at step 420, the optimal fuel injection rate may be computed given other sensor input provided to the ECU 214 regarding the load, emissions, etc. At step 422 the optimal flow rate is compared to the actual mass flow rate computed in step 416, for example, by:

$$\delta = \frac{m_j + m_{j-1}}{2m_{op}} \quad (30)$$

In step 424 the ECU 214 may adjust such injection parameters as injection pulse duration, period between injection pulses, injector pressure, etc. in order to bring the actual flow rate into agreement with the optimal flow rate.

Figure 18A:
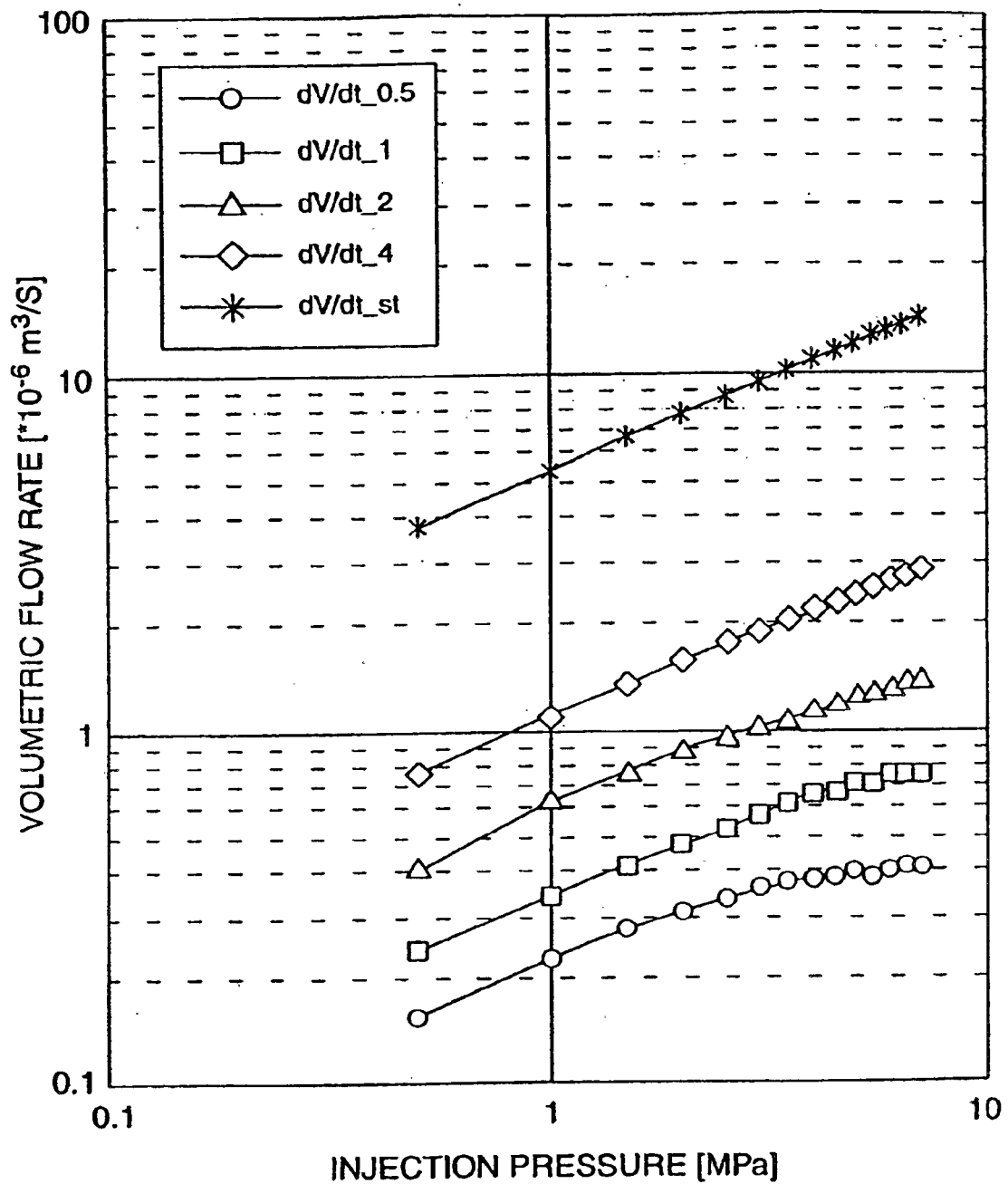
FIGS. 18A and 18B are charts showing a comparison of test results generated by the first electronic data processing method associated with FIGS. 16A and 16B and the second electronic data processing method associated with FIGS. 17A and 17B.
Figure 18B:
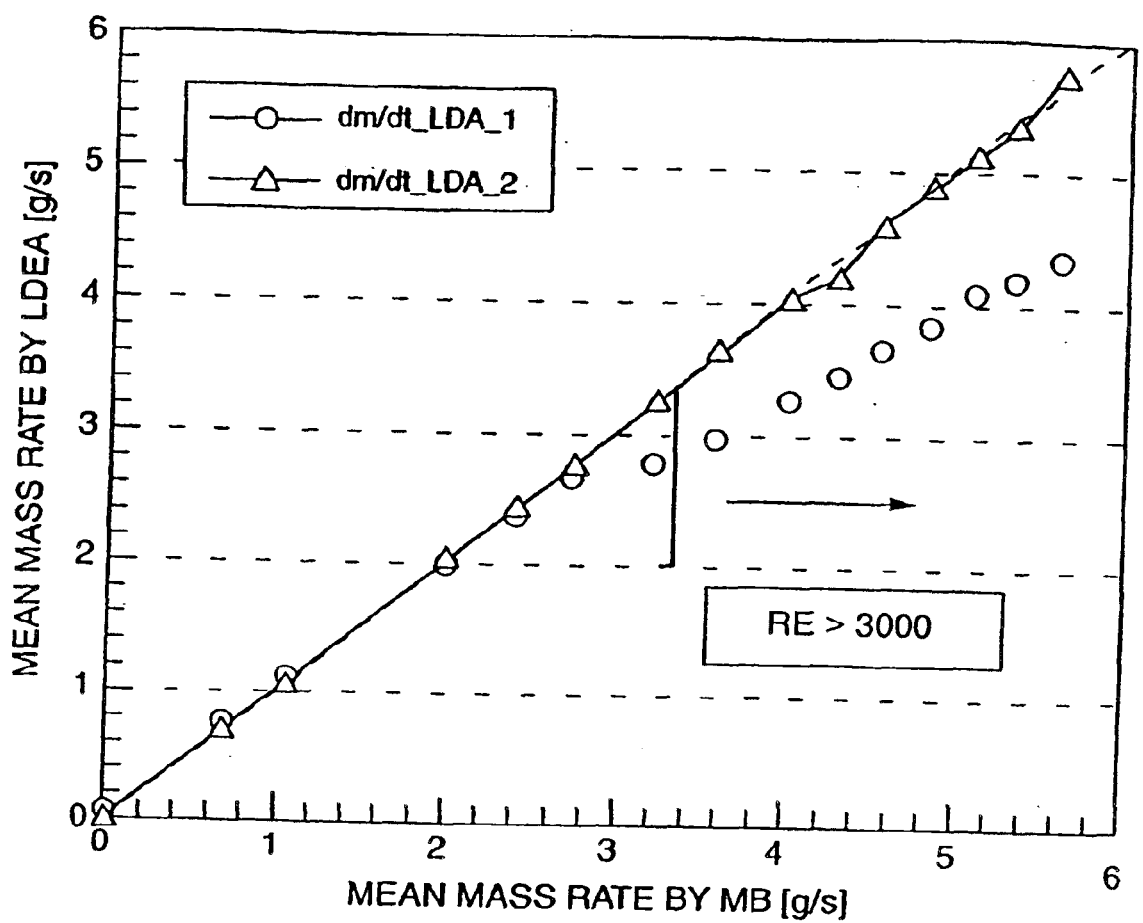

Referring to FIGS. 18A and 18B, it will be seen that the solution described for a periodically oscillating, turbulent flow in a pipeline of circular cross section with regard to FIGS. 17A and 17B provides more accurate results for high pressure diesel fuel injection systems than the solution for one-dimensional laminar flow described with respect to FIGS. 16A and 16B.

In order to test the relative merits of the two methods, a test was run using n-heptane having a density of 684 kg/m³ and a kinematic viscosity of 6.1×10⁻⁷ m²/s. A high pressure injection system was run at pressures ranging from 0.5 to 7.0 MPa. Mass balance measurements were obtained within 60 s within a range of a new tenths of a gram to a few hundredths of a gram. The relationship between injection pressure and mean flow rate, measured by mass balance, is shown for injection periods of 0.5 ms, 1.0 ms, 2.0 ms, 4.0 ms, and open valve (steady flow) in FIG. 18A results of the measurements by mass balance, the software method (LDA 1) of FIGS. 16A and 16B, and the software method (LDA 2) of FIGS. 17A and 17B are shown in FIG. 18B.

As shown in FIG. 18B, the laminar model LDA 1 has an accuracy, calculated by $$\delta = \frac{\dot{V}_{LDA} p - \dot{m}_{mass\ balance}}{\dot{m}_{mass\ balance}} \quad (31)$$

within ±2% when Re<2300 and flow rate is lower than 2 g/s. At increased injection pressures (or velocities, so that Re>3000), the method is limited and has an accuracy decreased by −24% because he velocity field does not reflect the turbulent fluctuation and therefore gives a lower velocity field than is actually developed n the flow. On the other hand, the turbulent model (LDA 2) demonstrates excellent correlation with mass balance measurement within a range of—1.4 to 2.0%. The turbulent model (LDA 2) may therefore be preferred with the high injection pressures and velocities (e.g., as encountered in diesel fuel injection systems), and may be used with either diesel or gasoline fuel injection systems. The laminar model (LDA 1) may, however, be used with reasonably acceptable performance, particularly with gasoline fuel injection systems, for reasons of economy.

From the point of instantaneous flow rate measurements, the present invention may be applied anywhere desired in the fuel flow stream. For example, the test point may be before the fuel injector receives the fuel, e.g., in the case of gasoline, direct injection gasoline and common rail type injection systems where direct flow/pressure is continuously applied from a high pressure source to an injector tip along the whole fuel delivery line. Due to this flow continuity, the pressure wave propagation permits measurement of velocity and/or pressure and/or flow rates at any reasonable point along the line. The instantaneous flow rate information is directly related to the pressure gradient reflecting any pressure change along the line. The opening and closing of the injector valve reflects the changes in time series with essentially the only differences in time-phases and intensities (there may be further flow differences between closed line, typically presented in the gasoline systems, and closed loop systems in the common rail, where the pressure control spill valves, installed in common rail and injector, splits the flow into two streams, i.e., one for injection and one or two for return—in such cases, the mass balance measurements used for flow rate measurement verification may be directly comparable with the LDA mean volume/mass obtained through the integration of flow rate over the injection cycle).

In another example, the test point may be after the fuel injector expels the fuel, e.g., in the case of unit type injectors (UI) or hydraulically actuated electronic unit injectors (HEUI) where pressure distribution dynamics are different from those mentioned above. More particularly, during the active injection stage, while high pressure is concentrated only into the injector intensification/accumulation chamber, the common delivery rail (delivery line) is completely (mechanically) disconnected from the high-pressure zone. In order to reflect the originally developed pressure-injection dynamics, there are two areas where the measurement can be performed. One is related to the available spaces inside of injector high-pressure chamber A second area is located in the fuel steam expelled from the injector.

In another example, the invention may be applied in the field of fuel injection equipment (FIE) to internal combustion engines, such that precise instantaneous fuel/air flow rate measurements provide control of the equivalence ratio that determines the combustion process (e.g., following the intake and injection strokes).

In another example, certain embodiments of the present invention may be utilized in applications including, but not limited to: medium and/or heavy diesel injection systems equipped with a unit type injector. The invention may provide measurements related to the very accurate timing of each injection event and fuel masses injected during single- or multi-burst injection cycle(s) with temporal resolution, for example, close to 0.01 down to 0.001 ms and mass resolution at the level of, for example, 0.01 down to 0.001 mg (0.01–0.001 mm³).

In another example (which example is intended to be illustrative and not restrictive), a flow meter according to an embodiment of the present invention may have performance as the follows:
1. Cost affordable for OEM and aftermarket automotive customers dealing with diesel/gasoline type FIE.
2. Technical characteristics:
    minimal resolution—0,05 mm³/stroke;
    measuring range—1 to 950 mm³/stroke;
    stroke rates—up to 5000 RPM for diesel injectors and 10,000 RPM for gasoline;
    multi-burst injection cycle—up to 5–10 splits;
    delays (dwell) between splits—as small as 100–500 microseconds.
3. Sample stroke-to-stroke data in real time (arrival events) so that rolling averages and standard deviations can be utilized practically for test, tuning and/or calibration purposes.
4. Size of the optical head (probe) may be portable, typical size may be, for example, 5" in diameter and ~10" in length (the size can be miniaturized as required, e.g., for the on-board sensor).

In another example, the stationary stand may use an He—Ne laser focused through a beam splitter to produce two coherent beams which are focused to intersect in the capillary pipe which is mounted on an optical bench. The forward scatter may be detected by a photomultiplier tube, which outputs the detected current to an interface board which may be mounted in a personal computer. Fluid flow may be provided by a fuel system having a high pressure pump which is triggered to provide injection pulses to a fuel injector (e.g., a swirl fuel injector) at a predetermined and/or controllable frequency. The instantaneous and integral mass rates may permit the testing, calibration, and setup of optimal characteristics of a fuel injection system (e.g., including one or more fuel injectors).

In another example, the portable flow meter may use a laser diode focused to reflect the beam through a prism and a holographic splitter which provides two beams focused to intersect in the control measurement zone of the capillary pipe. The capillary pipe may be mounted in-line in a motor vehicle's fuel line. Forward scatter may be focused on a PIN diode. The interface and electronic data processing system may be the same as that used in the stationary stand embodiment. The use of semiconductor components may render the portable flow meter compact and lightweight for transport, and adaptation of the capillary pipe for insertion into the vehicle's fuel line may provide dynamic, in situ diagnostic test, calibration, and setup data for optimal adjustment of the vehicle's fuel injection system.

In another example, the on-board sensor may have essentially the same optical components as the portable flow meter, except that the beam from the laser diode may be focused directly through an optic wire normal to the capillary pipe (as opposed to being reflected through a prism). The capillary pipe may be encased in a steel sheath, so that the sensor may be permanently installed in the vehicle's fuel pipeline. The PIN diode detector may be connected through an interface to the vehicle's engine control module, and the module's processor may execute the data processing software, integrating the flow meter sensor's input with other sensor data to control and adjust injection system characteristics to provide fuel economy, power increase, and/or reduced exhaust emissions.

In another example, the invention may provide a stationary stand flow meter for testing, calibration and setup of optimal fuel injection system characteristics for a high pressure fuel injection system, the flow meter indicating transient injection characteristics through instantaneous and integral mass rates.

In another example, the invention may provide a portable, compact, lightweight flow meter capable of connection into a vehicle's fuel line which provides data on transient high pressure fuel injection system characteristics for testing, calibration and setup of optimal fuel injection system parameters.

In another example, the invention may provide an on-board fuel meter sensor connected to a gasoline or diesel engine control module for providing measurement, calculation, and control of transient fuel injection characteristics in order to improve fuel economy, increase engine power, and/or reduce harmful or noxious exhaust emissions.

In another example, the invention may provide an electronic data processing apparatus and/or method for computing instantaneous and integral volumetric and mass flow rates in a periodically oscillating fluid flow pipe from instantaneous center line velocity measurements.

In another example, the invention may provide improved elements and arrangements thereof for the purposes described which improved elements and arrangements are inexpensive, dependable and effective in accomplishing their intended purposes.

In another example, the present invention provides a flow meter for measuring the instantaneous center line velocity in a pipe which uses an electronic data processing method to compute instantaneous and/or integral volumetric and/or mass flow rates, as well as other transient flow characteristics, from the velocity data by an essentially exact solution of the Navier-Stokes equations (for any periodically oscillating fluid flow in a pipe). While the embodiments of the flow meter described herein are adapted for measuring flow rates in a high pressure fuel injection system, the devices, methods and principles described herein are easily modified for other applications, including (but not limited to) industry, pharmacology and/or medicine.

Of note, the design of fuel injectors and control of the operation of fuel injectors (e.g. after installation) would be aided by a flow meter capable of providing data on the instantaneous volumetric now rate a fuel injection system, as well as a volumetric flow rate integrated over a specified time period, or a combination of the two. As discussed above, various embodiments of the present invention provide a flow meter which uses laser Doppler anemometry to measure the instantaneous center line velocity of fuel in a fuel pipe associated with a fuel injector. Further, various embodiments of the present invention process the data (e g., by Fourier transform) using a novel, essentially exact solution to Navier-Stokes equations for any periodically oscillating flow to obtain the instantaneous volumetric flow rate of fuel in the system (as well as other desired flow characteristics).

Of further note, the invention described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may be "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, all equipment models and specifications discussed herein are provided as examples only, and are intended to be illustrative and not restrictive. Further still, all of the plots disclosed herein are, of course, intended to be illustrative and not restrictive. Further still, the term "bench testing" refers to any testing facility (e.g., physically on a test bench, in a test device or apparatus, in an R&D laboratory, in a production test facility, etc.). Further still, although the software methods are described principally as using discrete Fourier transforms to calculate instantaneous flow rates, a fast Fourier transform (FFT) technique may be used, such as the radix-2 technique in which the number of samples is an integral power of 2 and the samples are padded with zeroes, in order to take advantage of the increased calculation speeds resulting from symmetry (of course, other FFT techniques known in the digital signal processing art may be used). Further still, the various steps may be performed in any desired order.

What is claimed is:

1. A flow meter for bench testing fuel flow characteristics in a fuel injection system, which fuel injection system includes at least one fuel injector, comprising:
   a measurement tube via which fuel flowing through the fuel injector passes;
   a laser-Doppler anemometer generating a pair of laser beams intersecting in a control measurement volume in a center line of fuel flow through the measurement tube;
   a velocity calculating mechanism connected to the laser-Doppler anemometer for calculating a series of instantaneous center line velocities of fuel flow through the measurement tube; and
   a flow rate calculating mechanism connected to the velocity calculating mechanism for calculating a series of instantaneous volumetric flow rates in the measurement tube and for calculating a mass flow rate by integrating the series of instantaneous volumetric flow rates.

2. The flow meter of claim 1, wherein the measurement tube is constructed at least in part from quartz glass.

3. The flow meter of claim 2, wherein the quartz glass is substantially transparent.

4. The flow meter of claim 1, further comprising an optical bench, wherein at least one of the measurement tube and the laser-Doppler anemometer is mounted to the optical bench.

5. The flow meter of claim 1, wherein the laser-Doppler anemometer comprises a laser light source and a photodetector.

6. The flow meter of claim 5, wherein the laser light source comprises a helium-neon laser and the photodetector comprises a photomultiplier tube.

7. The flow meter of claim 5, wherein the laser light source comprises a laser diode and the photodetector comprises a PIN diode.

8. The flow meter of claim 1, wherein the flow rate calculating mechanism includes means for:
   (a) performing an inverse Fourier transform to calculate a series of harmonic coefficients $c_0, \ldots, c_n$ from the series of instantaneous center line velocities;
   (b) computing a series of pressure coefficients $p_0, \ldots, p_n$ from the harmonic coefficients $c_0, \ldots, c_n$ by solving the equations $$p_0 = \frac{2c_0 v}{R^2} \text{ and } p_n = \frac{c_n i n\omega}{1 - \frac{1}{J_0(i^{3/2} T a_n)}}$$

(c) computing a series of instantaneous volumetric flow rates from the pressure coefficients $P_0, \ldots, P_n$ by solving the equation $$V(t) = \frac{\pi R^2}{2}\left(\frac{R^2 p_0}{4v} + \sum_{n=1}^{\infty}\left\{\frac{p_n}{n\omega} i e^{in\omega t}\left[\frac{4i^{1/2} J_1(i^{3/2} T a_n)}{T a_n J_0(i^{3/2} T a_n)} - 2\right] + C.C.\right\}\right); \text{ and}$$

(d) computing a mass flow rate by integrating the volumetric flow rates using the fluid density and cross sectional area of the measurement tube.

9. The flow meter of claim 1, wherein the flow rate calculating mechanism includes means for:
   (a) performing an inverse Fourier transform to calculate a first series of harmonic coefficients $c_0, \ldots, c_n$ and a second series of harmonic coefficients $c_0', \ldots, c_n'$ from the series of instantaneous center line velocities, where the summation in the first series is incremented when the Stokes layer thickness is greater than ten times the optic interference fringe from the intersection of the two laser beams and the summation in the second series is incremented when the Stokes layer thickness is not greater than ten times the optic interference fringe from the intersection of the two laser beams;
   (b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2\frac{c_0 v}{R^2}$$

$$p_{nz} = \frac{c_n n\omega i}{\left[1 - \frac{1}{J_0(i^{3/2} T a_n)}\right]}, n \in [1, N_\delta]$$

$$p'_{nz} + \sqrt{p'_{nz} p'_{nr}} = \frac{2 c'_n n\omega i}{\left[1 - \frac{1}{J_0(i^{3/2} T a_n)}\right]}, n \in [N_\delta + 1, N_{meas}];$$

(c) computing a series of instantaneous volumetric flow rates from the pressure coefficients $p_0, \ldots, p_n$ and $p_0', \ldots, p_n'$ by solving the equation $$\dot{V}(t) = 2\pi \int_0^R \left(\tilde{u} + \sqrt{\overline{u'v'}}\right) r \, dr = \frac{\pi R^2}{2}\left[\frac{p_0 R^2}{4v} + \sum_{n=1}^{\infty}\left(\frac{p_{nx} - \left(\frac{p'_{nz}}{2} + \frac{\sqrt{p'_{nz} p'_{nz}}}{2}\right)}{n\omega} i e^{in\omega t}\left[\frac{4i^{1/2} J_1(i^{3/2} T a_n)}{T a_n J_0(i^{3/2} T a_n)} - 2\right]\right) + C.C.\right]; \text{ and}$$

(d) computing a mass flow rate by integrating the volumetric flow rates using the fluid density and cross sectional area of the measurement tube.

10. The flow meter of claim 1, wherein the flow rate calculating mechanism includes means for:
   (a) performing an inverse Fourier transform on the series of instantaneous center line velocities to obtain a first series of harmonic coefficients $c_0, \ldots, c_n$, and a second series of harmonic coefficients $c_0', \ldots, c_n'$, where the summation in the first series is incremented when the Reynolds number is $\leq 3000$ and the summation in the second series is incremented when the Reynolds number is $> 3000$;
   (b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2\frac{c_0 v}{R^2}$$

$$p_{nz} = \frac{c_n n\omega i}{\left[1 - \frac{1}{J_0(i^{3/2} T a_n)}\right]}, n \in [1, N_\delta]$$

-continued $$p'_{nz} + \sqrt{p'_{nz}p'_{nr}} = \frac{2c'_n n\omega i}{\left[1 - \frac{1}{J_0(i^{3/2}Ta_n)}\right]}, n \in [N_\delta + 1, N_{meas}]; \text{ and}$$

(c) computing a series of instantaneous volumetric flow rates from the pressure coefficients $p_0, \ldots, p_n$, and $p_0', \ldots, p_n'$ by solving the equation $$\dot{V}(t) = 2\pi \int_0^R \left(\tilde{u} + \sqrt{\overline{u'v'}}\right) r dr = \frac{\pi R^2}{2} \left[ \frac{p_0 R^2}{4\nu} + \right.$$

$$\sum_{n=1}^\infty \left\{ \frac{\tilde{p}_{nx} - \left\langle \frac{p'_{nz}}{2} + \frac{\sqrt{p'_{nz}p'_{nz}}}{2} \right\rangle}{n\omega} i e^{in\omega t} \left[ \frac{4i^{1/2} J_1(i^{3/2}Ta_n)}{Ta_n J_0(i^{3/2}Ta_n)} - 2 \right] \right\} +$$

$$\left. C.C. \right].$$

11. The flow meter of claim 1, further comprising a fuel tank and a fuel injection pump.

12. The flow meter of claim 11, further comprising a controller connected to the fuel pump for controlling the duration and frequency of a plurality of fuel injection pulses.

13. The flow meter of claim 12, wherein the controller is capable of nanosecond pulse duration.

14. The flow meter of claim 1, wherein at least one of the velocity calculating mechanism and the flow rate calculating mechanism includes software.

15. A flow meter for bench testing fuel flow characteristics in a fuel injection system, which fuel injection system includes at least one fuel injector, comprising:
   at least one of an input pipe for supplying fuel to the fuel injector and an output pipe for receiving fuel from the fuel injector;
   a measurement tube installed in one of the input pipe and the output pipe;
   a laser-Doppler anemometer generating a pair of laser beams intersecting in a control measurement volume in a center line of fuel flow through the measurement tube;
   a velocity calculating mechanism connected to the laser-Doppler anemometer for calculating a series of instantaneous center line velocities of fuel flow through the measurement tube; and
   a flow rate calculating mechanism connected to the velocity calculating mechanism for calculating a series of instantaneous volumetric flow rates in the measurement tube and for calculating a mass flow rate by integrating the series of instantaneous volumetric flow rates.

16. The flow meter of claim 15, wherein the measurement tube is constructed at least in part from quartz glass.

17. The flow meter of claim 16, wherein the quartz glass is substantially transparent.

18. The flow meter of claim 15, further comprising an optical bench, wherein at least one of the measurement tube, the input pipe, the output pipe and the laser-Doppler anemometer is mounted to the optical bench.

19. The flow meter of claim 15, wherein the laser-Doppler anemometer comprises a laser light source and a photodetector.

20. The flow meter of claim 19, wherein the laser light source comprises a helium-neon laser and the photodetector comprises a photomultiplier tube.

21. The flow meter of claim 19, wherein the laser light source comprises a laser diode and the photodetector comprises a PIN diode.

22. The flow meter of claim 15, wherein the flow rate calculating mechanism includes means for:
   (a) performing an inverse Fourier transform to calculate a series of harmonic coefficients $c_0, \ldots, c_n$ from the series of instantaneous center line velocities;
   (b) computing a series of pressure coefficients $p_o, \ldots, p_n$ from the harmonic coefficients $c_0, \ldots, c_n$ by solving the equations $$p_0 = \frac{2c_0 \nu}{R^2} \text{ and } p_n = \frac{c_n in\omega}{1 - \frac{1}{J_0(i^{3/2}Ta_n)}}$$

(c) computing a series of instantaneous volumetric flow rates from the pressure coefficients $p_0, \ldots, p_n$, by solving the equation $$V(t) = \frac{\pi R^2}{2}\left( \frac{R^2 p_0}{4\nu} + \sum_{n=1}^\infty \left\{ \frac{p_n}{n\omega} i e^{in\omega t}\left[\frac{4i^{1/2}J_1(i^{3/2}Ta_n)}{Ta_n J_0(i^{3/2}Ta_n)} - 2\right] + C.C. \right\} \right); \text{ and}$$

(d) computing a mass flow rate by integrating the volumetric flow rates using the fluid density and cross sectional area of the measurement tube.

23. The flow meter of claim 15, wherein the flow rate calculating mechanism includes means for:
   (a) performing an inverse Fourier transform to calculate a first series of harmonic coefficients $c_0, \ldots, c_n$ and a second series of harmonic coefficients $c_0', \ldots, c_n'$ from the series of instantaneous center line velocities, where the summation in the first series is incremented when the Stokes layer thickness is greater than ten times the optic interference fringe from the intersection of the two laser beams and the summation in the second series is incremented when the Stokes layer thickness is not greater than ten times the optic interference fringe from the intersection of the two laser beams;
   (b) computing a series of pressure coefficients $p_0, \ldots, p_n$ and $p_0', \ldots, p_n'$ from the harmonic coefficients $c_0, \ldots, c_n$ and $c_0', \ldots, c_n'$ by solving the equations $$p_{oz} = 2\frac{c_o \nu}{R^2}$$

$$p_{nz} = \frac{c_n n\omega i}{\left[1 - \frac{1}{J_0(i^{3/2}Ta_n)}\right]}, n \in [1, N_\delta]$$

$$p'_{nz} + \sqrt{p'_{nz}p'_{nr}} = \frac{2c'_n n\omega i}{\left[1 - \frac{1}{J_0(i^{3/2}Ta_n)}\right]}, n \in [N_\delta + 1, N_{meas}];$$

(c) computing a series of instantaneous volumetric flow rates from the pressure coefficients $p_0, \ldots, p_n$ and $p_0', \ldots, p_n'$ by solving the equation $$\dot{V}(t) = 2\pi \int_0^R \left(\bar{u} + \sqrt{\overline{u'v'}}\right) r \, dr = \frac{\pi R^2}{2} \left[ \frac{p_0 R^2}{4\nu} + \right.$$

$$\sum_{n=1}^{\infty} \left\{ \frac{\hat{p}_{nx} - \left\langle \frac{p'_{nz}}{2} + \frac{\sqrt{p'_{nz}p'_{nz}}}{2} \right\rangle}{n\omega} i e^{in\omega t} \left[ \frac{4i^{1/2} J_1(i^{3/2} T a_n)}{T a_n J_0(i^{3/2} T a_n)} - 2 \right] \right\} +$$

$$\left. C.C. \right]; \text{ and}$$

(d) computing a mass flow rate by integrating the volumetric flow rates using the fluid density and cross sectional area of the measurement tube.

24. The flow meter of claim 15, wherein the flow rate calculating mechanism includes means for:

(a) performing an inverse Fourier transform on the series of instantaneous center line velocities to obtain a first series of harmonic coefficients $c_0, \ldots, c_n$, and a second series of harmonic coefficients $c_0', \ldots, c_n'$, where the summation in the first series is incremented when the Reynolds number is $\leq 3000$ and the summation in the second series is incremented when the Reynolds number is $> 3000$;

(b) computing a series of pressure coefficients $p_0, \ldots, p_n$ and $p_0', \ldots p_n'$ from the harmonic coefficients $c_0, \ldots, c_n$ and $c_0', \ldots, c_n'$ by solving the equations $$p_{oz} = 2\frac{c_0 \nu}{R^2}$$

$$\hat{p}_{nz} = \frac{c_n n \omega i}{\left[1 - \frac{1}{J_0(i^{3/2} T a_n)}\right]}, n \in [1, N_\delta]$$

$$p'_{nz} + \sqrt{p'_{nz}p'_{nr}} = \frac{2c'_n n \omega i}{\left[1 - \frac{1}{J_0(i^{3/2} T a_n)}\right]}, n \in [N_\delta + 1, N_{meas}]; \text{ and}$$

(c) computing a series of instantaneous volumetric flow rates from the pressure coefficients $p_0, \ldots, p_n$, and $p_0', \ldots, p_n'$ by solving the equation $$\dot{V}(t) = 2\pi \int_0^R \left(\bar{u} + \sqrt{\overline{u'v'}}\right) r \, dr = \frac{\pi R^2}{2} \left[ \frac{p_0 R^2}{4\nu} + \right.$$

$$\sum_{n=1}^{\infty} \left\{ \frac{\hat{p}_{nz} - \left\langle \frac{p'_{nx}}{2} + \frac{\sqrt{p'_{nz}p'_{nz}}}{2} \right\rangle}{n\omega} i e^{in\omega t} \left\{ \frac{4i^{1/2} J_1(i^{3/2} T a_n)}{T a_n J_0(i^{3/2} T a_n)} - 2 \right\} \right\} +$$

-continued $$\left. C.C. \right].$$

25. The flow meter of claim 15, further comprising a fuel tank and a fuel injection pump.

26. The flow meter of claim 25, further comprising a controller connected to the fuel pump for controlling the duration and frequency of a plurality of fuel injection pulses.

27. The flow meter of claim 26, wherein the controller is capable of nanosecond pulse duration.

28. The flow meter of claim 15, wherein:
(a) a cross-section of the input pipe is selected from the group of circular, oval, square and rectangular;
(b) a cross-section of the output pipe is selected from the group of circular, oval, square and rectangular; and
(c) a cross-section of the measurement tube is selected from the group of circular, oval, square and rectangular.

29. The flow meter of claim 15, wherein:
(a) the input pipe is included; and
(b) the measurement tube is installed in the input pipe.

30. The flow meter of claim 29, wherein the output pipe is not included.

31. The flow meter of claim 15, wherein:
(a) the output pipe is included; and
(b) the measurement tube is installed in the output pipe.

32. The flow meter of claim 31, wherein the input pipe is not included.

33. The flow meter of claim 31, further comprising a check valve installed in the output pipe to control backpressure in the output pipe.

34. The flow meter of claim 31, further comprising an orifice plate installed in the output pipe to control pressure in the output pipe.

35. The flow meter of claim 31, further comprising:
(a) a check valve installed in the output pipe to control backpressure in the output pipe; and
(b) an orifice plate installed in the output pipe to control pressure in the output pipe;
wherein: (i) the output pipe has a first end and a second end, which first end is connected to the fuel injector; (ii) the check valve is installed at the second end of the output pipe; and (iii) the orifice plate is installed at a position in the output pipe between the check valve and the measurement tube.

36. The flow meter of claim 35, further comprising a fuel injector tip holder for connecting an output tip of the fuel injector to the output pipe.

37. The flow meter of claim 36, further comprising a pressure transducer disposed within the fuel injector tip holder.

38. The flow meter of claim 15, wherein at least one of the velocity calculating mechanism and the flow rate calculating mechanism includes software.

\* \* \* \* \*